(12) United States Patent
Sharafat et al.

(10) Patent No.: US 11,258,498 B2
(45) Date of Patent: Feb. 22, 2022

(54) HYBRID BEAMFORMING IN COMMUNICATION SYSTEMS

(71) Applicants: Ahmad Reza Sharafat, Tehran (IR); Mohsen Tajallifar, Dezful (IR)

(72) Inventors: Ahmad Reza Sharafat, Tehran (IR); Mohsen Tajallifar, Dezful (IR)

(*) Notice: Subject to any disclaimer, the term of this patent is extended or adjusted under 35 U.S.C. 154(b) by 0 days.

(21) Appl. No.: 17/352,300

(22) Filed: Jun. 20, 2021

(65) Prior Publication Data

US 2021/0320698 A1  Oct. 14, 2021

Related U.S. Application Data

(60) Provisional application No. 63/041,832, filed on Jun. 20, 2020.

(51) Int. Cl.
*H04B 7/06* (2006.01)
*H04B 7/0456* (2017.01)

(52) U.S. Cl.
CPC ......... *H04B 7/0617* (2013.01); *H04B 7/0456* (2013.01)

(58) Field of Classification Search
CPC .... H04B 7/0695; H04B 7/088; H04B 7/0413; H04B 7/0456; H04B 17/309; H04B 7/06;
(Continued)

(56) References Cited

U.S. PATENT DOCUMENTS 9,967,014 B1 * 5/2018 Park .................... H04B 7/0456
10,020,596 B2 * 7/2018 Benjebbour ......... H01Q 21/225
(Continued)

*Primary Examiner* — Khanh C Tran
(74) *Attorney, Agent, or Firm* — Bajwa IP Law Firm; Haris Zaheer Bajwa

(57) ABSTRACT

A method for hybrid digital-analog beamforming a communication system. The method includes obtaining a plurality of transmit phase shifted signals by obtaining a hybrid precoding matrix $F_H$. The hybrid precoding matrix $F_H$ is obtained based on a plurality of dominant right eigenvectors of a first effective channel matrix associated with a set of wireless channels. The hybrid precoding matrix $F_H$ includes a product of a digital precoding matrix $$F_{BB}^{(1)}$$

and an analog precoding matrix $F_{RF}$. Each entry of the analog precoding matrix $F_{RF}$ includes one of zero or a respective complex value with unit magnitude. Obtaining the plurality of transmit phase shifted signals further includes obtaining a digital precoding matrix $$F_{BB}^{(2)}$$

based on the hybrid precoding matrix $F_H$. Each wireless channel in the set of wireless channels is associated with a base station and a respective user equipment (UE) in a set of UEs.

20 Claims, 20 Drawing Sheets

200

(58) Field of Classification Search
CPC ... H04B 7/0617; H04L 5/0023; H04L 5/0053; H04W 16/28; H04W 72/046
See application file for complete search history.

(56) References Cited

U.S. PATENT DOCUMENTS

| | | | |
|---|---|---|---|
| 10,790,889 B2* | 9/2020 | Morsali | H04B 7/0617 |
| 2014/0334564 A1* | 11/2014 | Singh | H04B 7/0456 |
| | | | 375/267 |
| 2016/0119910 A1* | 4/2016 | Krzymien | H04L 5/0023 |
| | | | 370/329 |
| 2018/0076881 A1* | 3/2018 | Zhu | H04B 7/0434 |
| 2019/0393948 A1* | 12/2019 | Zhao | H04B 7/0452 |
| 2020/0245412 A1* | 7/2020 | Kumar | H04B 7/0617 |
| 2020/0343948 A1* | 10/2020 | Shaban | H04B 7/0639 |
| 2021/0143957 A1* | 5/2021 | Gao | H04B 7/0617 |

* cited by examiner

HYBRID BEAMFORMING IN COMMUNICATION SYSTEMS

CROSS-REFERENCE TO RELATED APPLICATION

This application claims the benefit of priority from U.S. Provisional Patent Application Ser. No. 63/041,832, filed on Jun. 20, 2020, and entitled "HYBRID BEAMFORMING IN MMWAVE MASSIVE MIMO SYSTEMS," which is incorporated herein by reference in its entirety.

TECHNICAL FIELD

The present disclosure generally relates to wireless mobile communication systems, and particularly, to hybrid digital-analog beamforming in communication systems.

BACKGROUND

Mobile data is experiencing a phenomenal growth, and a paradigm shift is necessary in allocation, utilization and management of new resources. The concept of massive multiple-input multiple-output (MIMO) is a key enabler for increasing spectral efficiency. Massive MIMO may facilitate multi-stream transmission and increase gains of an effective channel, resulting in higher gains of spatial multiplexing and improved signal-to-noise ratio.

In fully digital beamforming in massive MIMO systems, there is one antenna element per each radio frequency (RF) chain, and beamforming is performed in baseband, wherein exercising full control over signal amplitude and phase is possible. In practice, however, the number of RF chains may be much less than the number of antenna elements. As a result, fully digital beamforming may be infeasible. Instead, hybrid (digital-analog) beamforming may be performed in baseband as well as in RF. Digital signal processing may be employed in baseband (in baseband precoder and in baseband combiner) to eliminate interference, and phase shifters in RF (in RF precoder and RF combiner) may be utilized to steer an RF beam to a desired direction.

Quality of service (QoS) is of paramount importance in future networks. Ignoring a users' QoS and instead focusing on spectral efficiency may lead to users' dissatisfaction and eventual migration to other service providers. A user may simultaneously request several services (e.g., web browsing, video streaming, messaging, etc.), each with a different QoS requirement in a single-user system or different users may request various services in a multi-user system. When a user simultaneously requests several services, QoS-aware systems are needed. Conventional hybrid beamforming methods mostly optimize a global measure of performance for an aggregate of all data streams without considering QoS for individual data streams when transmit power is minimized. In contrast, spectral efficiency of each data stream may be constrained to an acceptable value in QoS-aware systems when transmit power is minimized.

A QoS-aware massive MIMO system may be designed by minimizing transmit power while satisfying per data stream mean-squared-error (MSE) constraints. When a baseband precoder performs channel diagonalization and a baseband combiner is minimum MSE (MMSE) combiner, data may be transmitted over multiple sub-channels chosen from an effective channel gain matrix. By channel diagonalization, MSE of different streams may be independent and inversely proportional to both sub-channel gains and transmit power levels. Transmit power of each data stream may be minimized when the respective sub-channel gain of data streams, i.e., respective eigenvalues of an effective channel gain matrix, is maximized. Eigenvalues of effective channel gain matrix may be maximized by adopting eigen-beamforming at both transmitter and receiver, i.e., by adopting right and left eigenvectors of effective channel gain matrix as transmit and receive beamforming vectors, respectively.

In conventional hybrid beamforming, RF precoders and RF combiners may be utilized to perform eigen-beamforming. However, since RF precoders and RF combiners include only exponential entries, they may not be equal to the right and left eigenvectors of effective channel gain matrix. Therefore, RF precoders and RF combiners may provide approximations of the right and left eigenvectors of effective channel gain matrix. In determining the approximation, only phase information in eigenvectors of effective channel gain matrix may be utilized and amplitudes of eigenvectors may be ignored, resulting in small gains for sub-channels. To compensate for low gains, transmit power may be increased. In other words, QoS may be satisfied in the conventional hybrid beamforming but excessive transmit power may be required.

There is, therefore, a need for a hybrid beamforming method that guarantees per data stream QoS requirements. There is also a need for a hybrid beamforming method that minimizes transmit power of base station by maximizing effective channel gain matrix.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for hybrid digital-analog beamforming in communication systems. An exemplary method may include obtaining a plurality of transmit phase shifted signals, obtaining a plurality of transmit signals from the plurality of transmit phase shifted signals, and transmitting the plurality of transmit signals on a set of wireless channels. In an exemplary embodiment, obtaining the plurality of transmit phase shifted signals may include obtaining a hybrid precoding matrix $F_H$. In an exemplary embodiment, hybrid precoding matrix $F_H$ may be obtained by utilizing one or more processors. In an exemplary embodiment, hybrid precoding matrix $F_H$ may be obtained based on a plurality of dominant right eigenvectors of a first effective channel matrix. An exemplary first effective channel matrix may be associated with a set of channel matrices. In an exemplary embodiment, hybrid precoding matrix $F_H$ may include a product of a digital precoding matrix $F_{BB}^{(1)}$ and an analog precoding matrix $F_{RF}$. In an exemplary embodiment, each entry of analog precoding matrix $F_{RF}$ may include one of zero or a respective complex value with unit magnitude. In an exemplary embodiment, each channel matrix in the set of channel matrices may be associated with a base station (BS) and a respective user equipment (UE) in a set of UE.

In an exemplary embodiment, obtaining the plurality of transmit phase shifted signals may further include obtaining a digital precoding matrix $F_{BB}^{(2)}$ based on the hybrid precoding matrix $F_H$, obtaining a plurality of digitally precoded symbols based on digital precoding matrix $F_{BB}^{(2)}$, obtaining a plurality of frequency-upconverted signals from the plurality of digitally precoded symbols, and generating the plurality of transmit phase shifted signals from the plurality of frequency-upconverted signals.

In an exemplary embodiment, digital precoding matrix $F_{BB}^{(2)}$ may be obtained by utilizing the one or more processors. In an exemplary embodiment, digital precoding matrix $F_{BB}^{(2)}$ may be obtained based on a second effective channel matrix associated with hybrid precoding matrix $F_H$ and the set of channel matrices. In an exemplary embodiment, the plurality of digitally precoded symbols may be obtained by utilizing the one or more processors. In an exemplary embodiment, the plurality of digitally precoded symbols may be obtained by multiplying a transmit vector and a digital precoding matrix $F_{BB}$. An exemplary transmit vector may include a plurality of transmit symbols. In an exemplary embodiment, digital precoding matrix $F_{BB}$ may be equal to $F_{BB}^{(1)}F_{BB}^{(2)}$.

In an exemplary embodiment, an amplitude and a phase of each of the plurality of frequency-upconverted signals may be associated with a respective digitally precoded symbol of the plurality of digitally precoded symbols. In an exemplary embodiment, a number $N_t^{RF}$ of the plurality of transmit RF chains may satisfy a condition according to $N_t^{RF} \geq N_S$ where $N_S$ is a number of the plurality of transmit symbols. In an exemplary embodiment, the plurality of transmit phase shifted signals may be generated by utilizing a plurality of transmit phase shifters of the BS. In an exemplary embodiment, the plurality of transmit phase shifted signals may be generated by phase shifting the plurality of frequency-upconverted signals based on analog precoding matrix $F_{RF}$.

In an exemplary embodiment, the plurality of transmit signals may be transmitted by utilizing a plurality of transmit antennas of the BS. In an exemplary embodiment, the set of wireless channels may be associated with the set of channel matrices. In an exemplary embodiment, a number $N_t$ of the plurality of transmit antennas may satisfy a condition according to $N_t^{RF} < N_t$.

In an exemplary embodiment, obtaining the hybrid precoding matrix $F_H$ may include obtaining a hybrid combining matrix $W_{H,u}$ in a set of hybrid combining matrices and generating hybrid precoding matrix $F_H$ based on hybrid combining matrix $W_{H,u}$. In an exemplary embodiment, hybrid combining matrix $W_{H,u}$ may be obtained by utilizing the one or more processors. In an exemplary embodiment, hybrid combining matrix $W_{H,u}$ may be obtained based on a plurality of dominant left eigenvectors of a channel matrix $H_u$ in the set of channel matrices. In an exemplary embodiment, hybrid combining matrix $W_{H,u}$ may be associated with a $u^{th}$ UE in the set of UE where $1 \leq u \leq U$ and U is a size of the set of UEs. In an exemplary embodiment, hybrid combining matrix $W_{H,u}$ may include a product of a digital combining matrix $W_{BB,u}^{(1)}$ and an analog combining matrix $W_{RF,u0}$. In an exemplary embodiment, each entry of analog combining matrix $W_{RF,u}$ may include one of zero or a respective complex value with unit magnitude.

An exemplary method may further include obtaining a $u^{th}$ plurality of estimated symbols by computing a digital combining matrix $W_{BB,u}^{(2)}$, transmitting a $u^{th}$ combiner set to the $u^{th}$ and generating the $u^{th}$ the plurality of estimated symbols based on the $u^{th}$ combiner set. In an exemplary embodiment, the $u^{th}$ plurality of estimated symbols may be computed according to an operation defined by $W_{BB,u}^{(2)} = (H_{eff,u} F_{BB,u}^{1(2)} F_{BB,u}^{(2)H} H_{eff,u}^H + R_{\tilde{n},u})^{-1} H_{eff,u} F_{BB,u}^{(2)}$ where $H_{eff,u} = W_{H,u}^H H_u F_H$, $R_{\tilde{n},u} = W_{H,u}^H R_{n,u} W_{H,u}$, and $R_{n,u}$ is a covariance matrix of a noise vector at the $u^{th}$ UE. In an exemplary embodiment, the $u^{th}$ combiner set may be transmitted by the BS. In an exemplary embodiment, the $u^{th}$ combiner set may include digital combining matrix $W_{BB,u}^{(1)}$, digital combining matrix $W_{BB,u}^{(2)}$, and analog combining matrix $W_{RF,u}$. In an exemplary embodiment, the $u^{th}$ the plurality of estimated symbols may be generated by the $u^{th}$ UE.

In an exemplary embodiment, generating the $u^{th}$ plurality of estimated symbols may include receiving the $u^{th}$ combiner set, receiving a $u^{th}$ plurality of receive signals associated with the plurality of transmit signals, obtaining a $u^{th}$ plurality of receive phase shifted signals from the $u^{th}$ plurality of receive signals, obtaining a $u^{th}$ plurality of frequency-downconverted signals from the $u^{th}$ plurality of receive phase shifted signals, and computing the $u^{th}$ plurality of estimated symbols based on the $u^{th}$ plurality of frequency-downconverted signals.

In an exemplary embodiment, the $u^{th}$ combiner set may be received by the $u^{th}$ UE. In an exemplary embodiment, the $u^{th}$ plurality of receive signals may be received by utilizing a $u^{th}$ plurality of receive antennas of the $u^{th}$ UE. In an exemplary embodiment, the $u^{th}$ plurality of receive phase shifted signals may be obtained by utilizing a $u^{th}$ plurality of receive phase shifters of the $u^{th}$ UE. In an exemplary embodiment, the $u^{th}$ plurality of receive phase shifted signals may be obtained by phase shifting the $u^{th}$ plurality of receive signals based on analog combining matrix $W_{RF,u}$. In an exemplary embodiment, the $u^{th}$ plurality of frequency-downconverted signals may be obtained by utilizing a $u^{th}$ plurality of receive RF chains of the $u^{th}$ UE. In an exemplary embodiment, an amplitude and a phase of each of the $u^{th}$ plurality of frequency-downconverted signals may be associated with a respective receive phase shifted signal of the $u^{th}$ plurality of receive phase shifted signals. In an exemplary embodiment, a number $N_{r,u}^{RF}$ of the $u^{th}$ plurality of receive RF chains may satisfy a condition according to $N_{r,u}^{RF} \geq N_u$ where $N_u$ is a number of the $u^{th}$ plurality of estimated symbols. In an exemplary embodiment, the number of the $u^{th}$ plurality of receive RF chains may satisfy another condition according to $N_{r,u}^{RF} < N_{r,u}$ where $N_{r,u}$ is a number of the $u^{th}$ plurality of receive antennas. In an exemplary embodiment, the $u^{th}$ plurality of estimated symbols may be computed by utilizing the one or more processors. In an exemplary embodiment, the $u^{th}$ plurality of estimated symbols may be computed by multiplying a receive vector by a digital combining matrix $W_{BB,u}$. In an exemplary embodiment, the receive vector may include the $u^{th}$ plurality of frequency-downconverted signals. In an exemplary embodiment, digital combining matrix $W_{BB,u}$ may be equal to $W_{BB,u}^{(1)}W_{BB,u}^{(2)}$.

In an exemplary embodiment, obtaining hybrid combining matrix $W_{H,u}$ may include setting each entry of an RF combining matrix $\overline{W}_{RF}^{(0)}$ to one of zero or a respective complex value, and repeating a first iterative process until a first termination condition is satisfied. An exemplary complex value may include a unit amplitude and a random phase.

In an exemplary embodiment, an $r^{th}$ iteration of the first iterative process may include computing a baseband combining matrix $\overline{W}_{BB}^{(r)}$ and computing an RF combining matrix $\overline{W}_{RF}^{(r)}$. In an exemplary embodiment, baseband combining matrix $\overline{W}_{BB}^{(r)}$ may be computed according to an operation defined by $\overline{W}_{BB}^{(r)} = (\overline{W}_{RF}^{(r-1)H}\overline{W}_{RF}^{(r-1)})^{-1}\overline{W}_{RF}^{(r-1)H}V_F$ where $r \geq 1$ is an integer and $V_F$ includes the plurality of dominant left eigenvectors. In an exemplary embodiment, RF combining matrix $\overline{W}_{RF}^{(r)}$ may be computed by one of setting a $(k,l)^{th}$ entry of $\overline{W}_{RF}^{(r)}$ to a first value or setting the $(k, l)^{th}$ entry of $\overline{W}_{RF}^{(r)}$ to one of zero or a second value. An exemplary first value may be equal to $e^{-j\angle \beta_{k,l}(1)}$ where $$\beta_{k,l}^{(1)} = \sum_{n=1}^{N_{r,u}^{RF}} \xi_{k,n}^* W_{l,n},$$

$\xi_{k,n} = V_{k,n} - \Sigma_{i \neq l} e^{j\varphi_{k,i}} W_{i,n}$, $V_{k,n}$ is a $(k, n)^{th}$ entry of $V_F$, $W_{l,n}$ is an $(l, n)^{th}$ entry of $\overline{W}_{BB}^{(r)}$, and $e^{j\varphi_{k,i}}$ is a $(k, l)^{th}$ entry of $\overline{W}_{RF}^{(r-1)}$. An exemplary second value may be equal to $e^{-j\angle \beta_{k,l}(2)}$ where $\beta_{k,l}^{(2)} =$ $$\sum_{n=1}^{N_{r,u}^{RF}} V_{k,n}^* W_{l,n}.$$

An exemplary first termination condition may be defined according to $\|\overline{W}_{RF}^{(r-1)} \overline{W}_{BB}^{(r-1)} - V_F\|_F - \|\overline{W}_{RF}^{(r)} \overline{W}_{BB}^{(r)} - V_F\|_F \leq \in_W$ where $\in_W$ is a first threshold and $\|.\|_F$ is a Frobenius norm. In an exemplary embodiment, hybrid combining matrix $W_{H,u}$ may be equal to $\overline{W}_{RF}^{(r_1)} \overline{W}_{BB}^{(r_1)}$ where $r_1$ is a total number of iterations of the first iterative process when the first termination condition is satisfied. In an exemplary embodiment, analog combining matrix $W_{RF,u}$ may be equal to $\overline{W}_{RF}^{(r_1)}$. In an exemplary embodiment, the digital combining matrix $W_{BB,u}^{(1)}$ may be equal to $\overline{W}_{BB}^{(r_1)}$.

In an exemplary embodiment, generating hybrid precoding matrix $F_H$ may include setting each entry of an RF precoding matrix $\overline{F}_{RF}^{(0)}$ to one of zero or a respective complex value, and repeating a second iterative process until a second termination condition is satisfied. An exemplary complex value may include a unit amplitude and a random phase.

In an exemplary embodiment, an $r^{th}$ iteration of the second iterative process may include computing a baseband precoding matrix $\overline{F}_{BB}^{(r)}$ and computing an RF precoding matrix $\overline{F}_{RF}^{(r)}$. In an exemplary embodiment, baseband precoding matrix $\overline{F}_{BB}^{(r)}$ may be computed according to an operation defined by $\overline{F}_{BB}^{(r)} = (\overline{F}_{RF}^{(r-1)H} \overline{F}_{RF}^{(r-1)})^{-1} \overline{F}_{RF}^{(r-1)H} V_W$ where $V_W$ includes the plurality of dominant right eigenvectors of the first effective channel matrix. In an exemplary embodiment, the first effective channel matrix may be equal to $W_{mu} H_{mu}$ where $H_{mu} = [H_1^T \ldots H_U^T]^T$ and $W_{mu}$ is a block diagonal matrix. In an exemplary embodiment, each diagonal block of $W_{mu}$ may include a respective hybrid combining matrix in the set of hybrid combining matrices.

In an exemplary embodiment, RF precoding matrix $\overline{F}_{RF}^{(r)}$ may be computed by one of setting a $(q, s)^{th}$ entry of $\overline{F}_{RF}^{(r)}$ to a third value or setting the $(q, s)^{th}$ entry of $\overline{F}_{RF}^{(r)}$ to one of zero or a fourth value. An exemplary third value may be equal to $e^{-j\angle \gamma_{q,s}(1)}$ where $\gamma_{q,s}^{(1)} =$ $$\sum_{n=1}^{N_t^{RF}} \delta_{q,n}^* F_{s,n}, \delta_{q,n} = V_{q,n} - \sum_{i \neq s} e^{j\theta_{q,i}} F_{i,n}, V_{q,n}$$

is a $(q, n)^{th}$ entry of $V_W$, $F_{s,n}$ is an $(s, n)^{th}$ entry of $\overline{F}_{BB}^{(r)}$, and $e^{j\theta_{q,i}}$ is a $(q, i)^{th}$ entry of $\overline{F}_{RF}^{(r-1)}$. An exemplary fourth value may be equal to $e^{-j\angle \gamma_{q,s}(2)}$ where $\gamma_{q,s}^{(2)} = \Sigma_{n=1}^{N_t^{RF}} V_{q,n}^* F_{s,n}$. An exemplary second termination condition may be defined according to $\|\overline{F}_{RF}^{(r-1)} \overline{F}_{BB}^{(r-1)} - V_W\|_F - \|\overline{F}_{RF}^{(r)} \overline{F}_{BB}^{(r)} - V_W\|_F \leq \in_F$ where $\in_F$ is a second threshold. In an exemplary embodiment, hybrid precoding matrix $F_H$ may be equal to $\overline{F}_{RF}^{(r_2)} \overline{F}_{BB}^{(r_2)}$ where $r_2$ is a total number of iterations of the second iterative process when the second termination condition is satisfied. In an exemplary embodiment, the analog precoding matrix $F_{RF}$ may be equal to $\overline{F}_{RF}^{(r_2)}$. In an exemplary embodiment, digital precoding matrix $F_{BB}^{(1)}$ may be equal to $\overline{F}_{BB}^{(r_2)}$.

In an exemplary embodiment, obtaining the digital precoding matrix $F_{BB}^{(2)}$ may include obtaining a precoding matrix $F_{BB,u}^{(2)}$. In an exemplary embodiment, precoding matrix $F_{BB,u}^{(2)}$ may be associated with the $u^{th}$ UE. In an exemplary embodiment, obtaining precoding matrix $F_{BB,u}^{(2)}$ may include setting a unitary matrix $V_{1,u}$ to $N_u$ least dominant right eigenvectors of an interference channel $\overline{H}_u$, setting a unitary matrix $V_{2,u}$ to a plurality of right eigenvectors of $$R_{\tilde{n}_u}^{-\frac{1}{2}} H_{\mathit{eff},u} V_{1,u},$$

obtaining a transmit power allocation matrix $P_u$, and computing precoding matrix $F_{BB,u}^{(2)}$.

In an exemplary embodiment, interference channel $\overline{H}_u$ may be equal to $[H_{\mathit{eff},1}^T, \ldots, H_{\mathit{eff},u-1}^T, H_{\mathit{eff},u+1}^T, \ldots, H_{\mathit{eff},U}^T]^T$ where $U > 1$. In an exemplary embodiment, transmit power allocation matrix $P_u$ may be obtained based on the set of channel matrices, hybrid precoding matrix $F_H$, and the hybrid combining matrices set. In an exemplary embodiment, transmit power allocation matrix $P_u$ may include a diagonal matrix. In an exemplary embodiment, each diagonal entry of transmit power allocation matrix $P_u$ may include a respective non-negative value. In an exemplary embodiment, precoding matrix $F_{BB,u}^{(2)}$ may be computed according to an operation defined by $$F_{BB,u}^{(2)} = V_{1,u} V_{2,u} P_u^{\frac{1}{2}}.$$

In an exemplary embodiment, digital precoding matrix $F_{BB}^{(2)}$ may be equal to $[F_{BB,1}^{(2)}, \ldots, F_{BB,U}^{(2)}]$.

In an exemplary embodiment, obtaining transmit power allocation matrix $P_u$ may include computing a $k^{th}$ diagonal entry $p_{u,k}$ of transmit power allocation matrix $P_u$ according to one of a first operation or a second operation. In an exemplary embodiment, the first operation may be defined by $p_{u,k} = 1/\lambda_{u,k}^{-1}(\rho_{u,k}^{-1} - 1)$ where $\lambda_{u,k}$ is a $k^{th}$ dominant eigenvalue $$R_{\tilde{n}_u}^{-\frac{1}{2}} H_{\mathit{eff},u} V_{1,u},$$

and $\rho_{u,k}$ is a $k^{th}$ maximum acceptable mean squared error of the $u^{th}$ UE. In an exemplary embodiment, the second operation may be defined by $$p_{u,k} = \max\left(\mu \lambda_{u,k}^{-\frac{1}{2}} - \lambda_{u,k}^{-1}, 0\right)$$

where μ satisfies a condition according to $$\Sigma_{u=1}^{U} \Sigma_{k=1}^{N_s} \max\left(\mu \lambda_{u,k}^{-\frac{1}{2}} - \lambda_{u,k}^{-1}, 0\right) = P_{max},$$

and $P_{max}$ is a power budget of the BS.

In an exemplary embodiment, obtaining digital precoding matrix $F_{BB}^{(2)}$ may include obtaining a precoding matrix $F_{BB,1}^{(2)}$. In an exemplary embodiment, digital precoding matrix $F_{BB}^{(2)}$ may be associated with a first ($1^{st}$) UE in the set of UEs set. In an exemplary embodiment, obtaining precoding matrix $F_{BB,1}^{(2)}$ may include setting a unitary matrix $V_3$ to a plurality of right eigenvectors of $$R_{\tilde{n},1}^{-\frac{1}{2}} H_{eff,1},$$

obtaining a transmit power allocation matrix $P_1$, and computing precoding matrix $F_{BB,1}^{(2)}$ based on transmit power allocation matrix $P_1$. In an exemplary embodiment, transmit power allocation matrix $P_1$ may be obtained based on the set of channel matrices, hybrid precoding matrix $F_H$, and the set of hybrid combining matrices. In an exemplary embodiment, transmit power allocation matrix $P_1$ may include a diagonal matrix. In an exemplary embodiment, each diagonal entry of transmit power allocation matrix $P_1$ may include a respective non-negative value. In an exemplary embodiment, precoding matrix $F_{BB,1}^{(2)}$ may be computed according to an operation defined by $$F_{BB,1}^{(2)} = V_3 P_1^{\frac{1}{2}}.$$

In an exemplary embodiment, digital precoding matrix $F_{BB}^{(2)}$ may be equal to $F_{BB,1}^{(2)}$.

In an exemplary embodiment, obtaining transmit power allocation matrix $P_1$ may include computing a $k^{th}$ diagonal entry $p_{1,k}$ of transmit power allocation matrix $P_1$ according to one of a third operation and a fourth operation. In an exemplary embodiment, the third operation may be defined by $p_{1,k} = 1/\lambda_{1,k}^{-1}(\rho_{1,k}^{-1} - 1)$ where $\lambda_{1,k}$ is a $k^{th}$ dominant eigenvalue of $$R_{\tilde{n},1}^{-\frac{1}{2}} H_{eff,1},$$

and $\rho_{1,k}$ is a $k^{th}$ maximum acceptable mean squared error of the first ($1^{st}$) UE. In an exemplary embodiment, the fourth operation may be defined by $$p_{1,k} = \max\left(\mu \lambda_{1,k}^{-\frac{1}{2}} - \lambda_{1,k}^{-1}, 0\right)$$

where μ satisfies a condition according to $$\Sigma_{k=1}^{N_s} \max\left(\mu \lambda_{1,k}^{-\frac{1}{2}} - \lambda_{1,k}^{-1}, 0\right) = P_{max}.$$

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
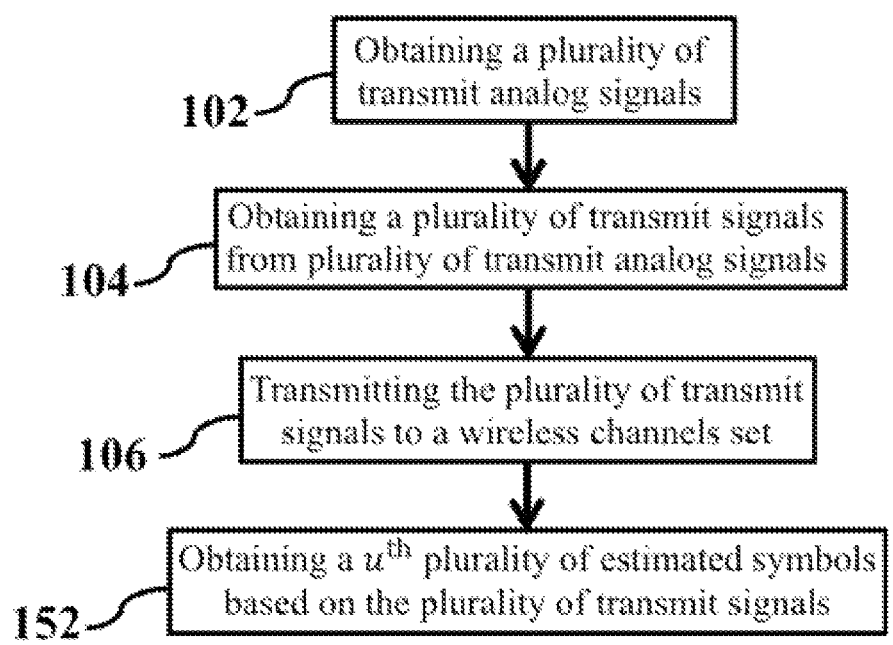
FIG. 1A shows a flowchart of a method for hybrid digital-analog beamforming in a communication system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed exemplary method and system for hybrid digital-analog beamforming in a communication system. An exemplary method may minimize a transmit power of a base station (BS) by maximizing a gain of an exemplary effective channel. An exemplary BS may include a two-part baseband precoder. An exemplary BS may further include a radio frequency (RF) precoder. A first part of an exemplary two-part baseband precoder and an exemplary RF precoder may be obtained by maximizing a gain of an exemplary effective channel between a BS and a number of user equipment (UE). A second part of an exemplary two-part baseband precoder may be obtained to diagonalize an exemplary effective channel, resulting in multiple sub-channels of the effective channel. Each exemplary UE may include a two-part baseband combiner. Each exemplary UE may further include an RF combiner. A first part of an exemplary two-part baseband combiner and an exemplary RF combiner may be obtained to maximize a gain of an exemplary effective channel. A second part of an exemplary two-part baseband combiner may include a minimum mean-squared-error (MNISE) combiner.

A first part of exemplary two-part baseband precoder and an exemplary RF precoder may be obtained by approximating right eigenvectors of an exemplary channel gain matrix. An exemplary approximation may be performed by minimizing a Euclidean distance between precoders (the first part of the two-part baseband precoder and the RF precoder) and right eigenvectors. An exemplary Euclidean distance may be minimized by performing an iterative process that iteratively minimizes the Euclidean distance. Similarly, a first part of exemplary two-part baseband combiner and an exemplary RF combiner may be obtained by approximating left eigenvectors of an exemplary effective channel gain matrix. An exemplary approximation may be performed by minimizing a Euclidean distance between combiners (the first part of the two-part baseband combiner and the RF combiner) and left eigenvectors. An exemplary Euclidean distance may be minimized by performing an iterative process that iteratively minimizes the Euclidean distance. As a result, an exemplary BS and a number of UEs may maximize a gain of each sub-channel of an exemplary effective channel.

In contrast to conventional one-part baseband, in two-part baseband, a combination of an RF precoder and a first part of a baseband precoder may provide linear combinations of exponential entries in the RF precoder. Exemplary linear combinations may be used to approximate right eigenvectors of an exemplary channel matrix. An exemplary approximation may include minimizing a Euclidean distance between each linear combination and a respective right eigenvector. Exemplary RF combiner and a second part of the two-part baseband combiner may approximate left eigenvectors of an exemplary channel matrix by linear combinations of exponential entries in an exemplary RF combiner. In an exemplary method, both phase and amplitude information in eigenvectors of an exemplary channel gain matrix may be utilized. Specifically, both phase and amplitude information may be extracted from exemplary eigenvectors by minimizing the Euclidean distance between eigenvectors and linear combinations of exponential entries. As a result, compared with a one-part baseband, eigenvectors of an exemplary channel gain matrix may be more accurately approximated by a two-part baseband, resulting in larger eigenvalues, i.e., higher gains for sub-channels.

An exemplary power allocation at a second part of a two-part baseband precoder may be performed. An exemplary power allocation may minimize a transmit power while satisfying per data stream quality of service (QoS) requirements. Specifically, transmit power of each data stream may be obtained by solving an optimization problem with a transmit power minimization objective function under a respective constraint on QoS of each data stream. Then, QoS requirements are satisfied by embedding transmit power of each data stream in a second part of two-part baseband precoder and processing data streams with the second part. Alternatively, an exemplary power allocation may minimize a sum-MSE of data streams while keeping a transmit power of an exemplary BS less than a power budget of the BS. Specifically, transmit power of each data stream may be obtained by solving an optimization problem with a sum-MSE minimization objective function under a power budget constraint. Then, sum-MSE is minimized by embedding transmit power of each data stream in a second part of two-part baseband precoder and processing data streams with the second part.

FIG. 1A shows a flowchart of a method for hybrid digital-analog beamforming in a communication system. An exemplary method 100 may include obtaining a plurality of transmit phase shifted signals (step 102), obtaining a plurality of transmit signals from the plurality of transmit phase shifted signals (step 104), and transmitting the plurality of transmit signals to a wireless channels set (step 106). In an exemplary embodiment, method 100 may include obtaining a two-part baseband precoder and an RF precoder of a base station (BS). In an exemplary embodiment, the two-part baseband precoder and the RF precoder may be utilized to generate the plurality of transmit signals.

Figure 2A:
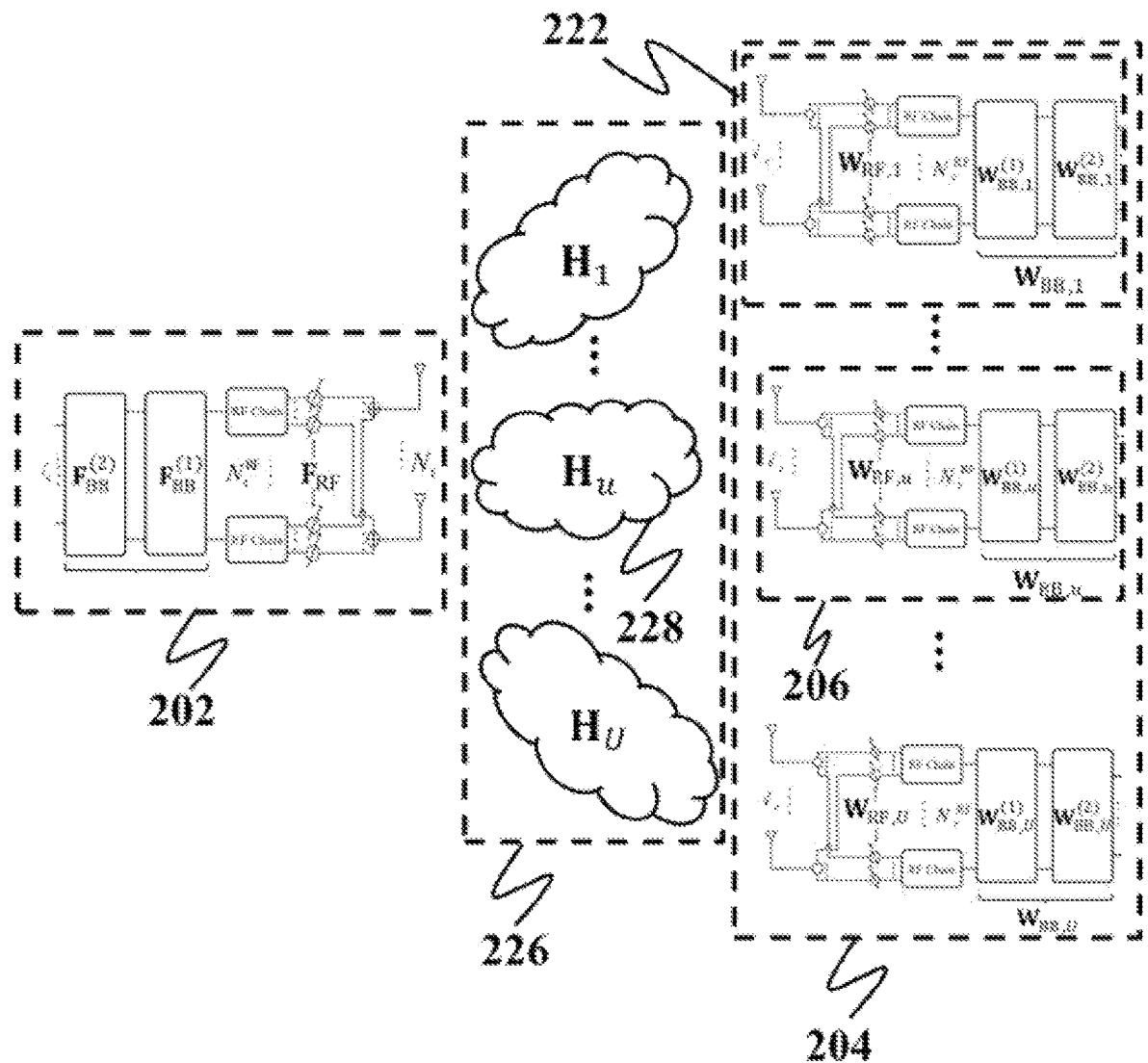
FIG. 2A shows a schematic of a communication system, consistent with one or more exemplary embodiments of the present disclosure.

FIG. 2A shows a schematic of a communication system, consistent with one or more exemplary embodiments of the present disclosure. In an exemplary embodiment, different steps of method 100 may be implemented by utilizing a communication system 200. In an exemplary embodiment, communication system 200 may include a base station (BS) 202 and a set 204 of user equipment (UE).

Figure 1B:
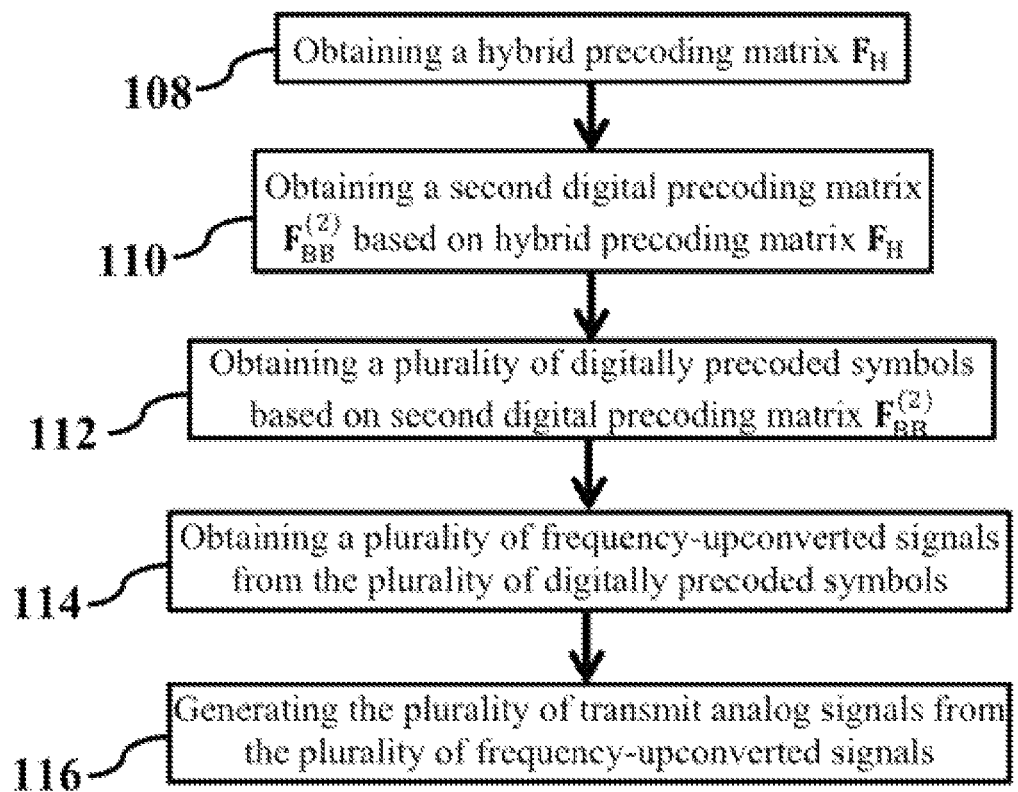
FIG. 1B shows a flowchart for obtaining a plurality of transmit phase shifted signals, consistent with one or more exemplary embodiments of the present disclosure.

For further detail with respect to step 102, FIG. 1B shows a flowchart for obtaining a plurality of transmit phase shifted signals, consistent with one or more exemplary embodiments of the present disclosure. Referring to FIGS. 1B and 2A, in an exemplary embodiment, obtaining the plurality of transmit phase shifted signals may include obtaining a hybrid precoding matrix $F_H$ (step 108), obtaining a digital precoding matrix $F_{BB}^{(2)}$ based on hybrid precoding matrix $F_H$ (step 110), obtaining a plurality of digitally precoded symbols based on digital precoding matrix $F_{BB}^{(2)}$ (step 112), obtaining a plurality of frequency-upconverted signals from the plurality of digitally precoded symbols (step 114), and generating the plurality of transmit phase shifted signals from the plurality of frequency-upconverted signals (step 116).

Figure 1C:
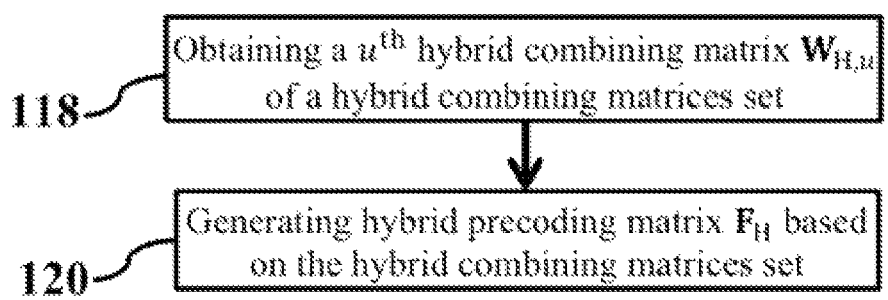
FIG. 1C shows a flowchart for obtaining a hybrid precoding matrix, consistent with one or more exemplary embodiments of the present disclosure.

In further detail regarding step 108, FIG. 1C shows a flowchart for obtaining a hybrid precoding matrix, consistent with one or more exemplary embodiments of the present disclosure. In an exemplary embodiment, obtaining hybrid precoding matrix $F_H$ may include obtaining a hybrid combining matrix $W_{H,u}$ of a set of hybrid combining matrices (step 118) and generating hybrid precoding matrix $F_H$ based on the set of hybrid combining matrices (step 120).

Figure 2B:
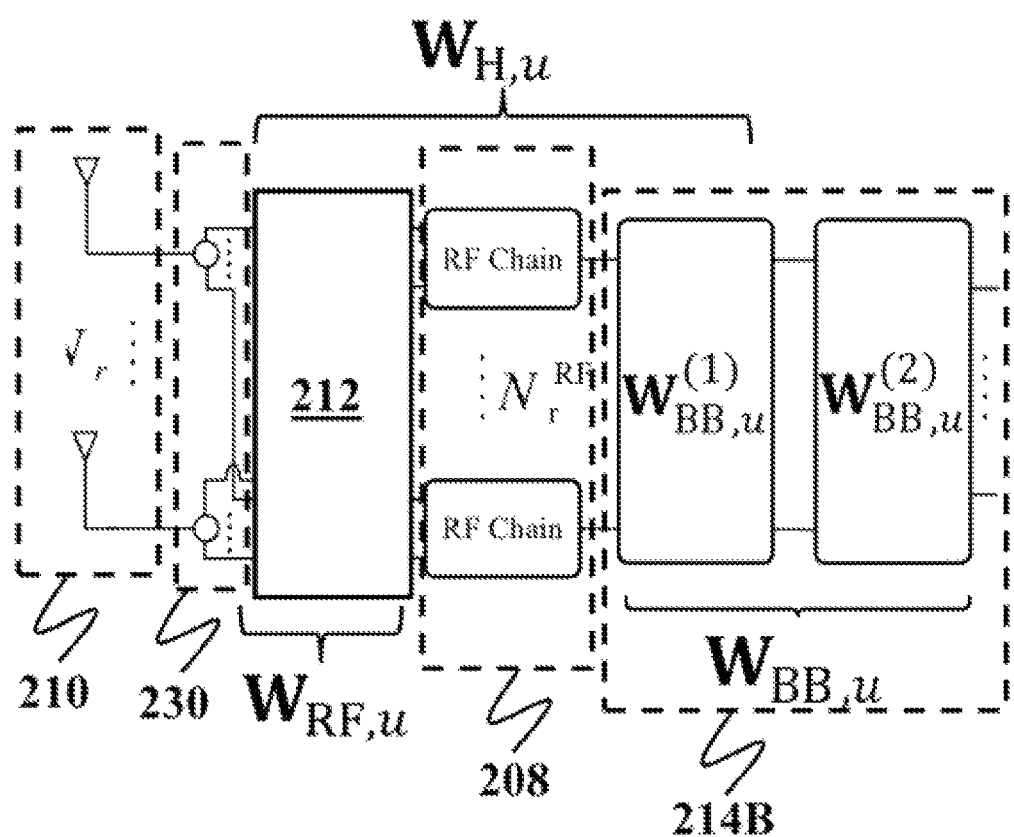
FIG. 2B shows a schematic of an overview of a user equipment, consistent with one or more exemplary embodiments of the present disclosure.

For further detail with regard to step 118, FIG. 2B shows a schematic of an overview of a user equipment, consistent with one or more exemplary embodiments of the present disclosure. In an exemplary embodiment, a $u^{th}$ UE 206 in set 204 of UE may include a $u^{th}$ plurality of receive radio frequency (RF) chains 208, a $u^{th}$ plurality of receive antennas 210, and a $u^{th}$ plurality of receive phase shifters 212. Referring to FIGS. 2A and 2B, in an exemplary embodiment, hybrid combining matrix $W_{H,u}$ may be obtained based on a plurality of dominant left eigenvectors of a channel matrix $H_u$ in a set of channel matrices $H_{set}=\{H_1, \ldots, H_U\}$ where $1 \leq u \leq U$ and U is a size of set 204 of UEs. In an exemplary embodiment, channel matrix $H_u$ may include a gain matrix of a multiple-input multiple-output (MIMO) channel between BS 202 and UE 206. In an exemplary embodiment, UE 206 may combine a plurality of receive signals according to hybrid combining matrix $W_{H,u}$. In an exemplary embodiment, hybrid combining matrix $W_{H,u}$ may include a product of a digital combining matrix $W_{BB,u}^{(1)}$ and an analog combining matrix $W_{RF,u}$.

In an exemplary embodiment, hybrid combining matrix $W_{H,u}$ may be obtained by approximating a plurality of dominant left eigenvectors of channel matrix $H_u$. In an exemplary embodiment, approximating the plurality of dominant left eigenvectors may include minimizing a first Euclidean distance between hybrid combining matrix $W_{H,u}$ and a unitary matrix $V_F$. In an exemplary embodiment, unitary matrix $V_F$ may include the plurality of dominant left eigenvectors. An exemplary matrix A may be referred to as a unitary matrix when $A^H A = I$ where $A^H$ is a Hermitian of A and I is an identity matrix. In an exemplary embodiment, minimizing the first Euclidean distance may include minimizing $\|W_{RF,u} W_{BB,u}^{(1)} - V_F\|_F^2$ where $\|A\|_F$ is a Frobenius norm of A.

Figure 1D:
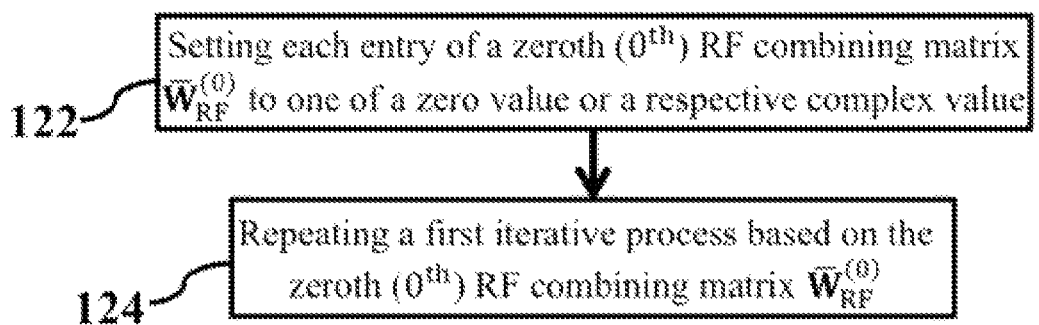
FIG. 1D shows a flowchart for obtaining a hybrid combining matrix, consistent with one or more exemplary embodiments of the present disclosure.

In an exemplary embodiment, step 118 may include obtaining hybrid combining matrix $W_{H,u}$. FIG. 1D shows a flowchart for obtaining a hybrid combining matrix, consistent with one or more exemplary embodiments of the present disclosure. In an exemplary embodiment, obtaining hybrid combining matrix $W_{H,u}$ may include setting each entry of an RF combining matrix $\overline{W}_{RF}^{(0)}$ to one of zero or a respective complex value (step 122), and repeating a first iterative process based on RF combining matrix $\overline{W}_{RF}^{(0)}$ (step 124).

Referring to FIGS. 1D and 2B, in an exemplary embodiment, step 122 may include setting each entry of an RF combining matrix $\overline{W}_{RF}^{(0)}$ to one of zero or a respective complex value. In other words, in an exemplary embodiment, each entry of RF combining matrix $\overline{W}_{RF}^{(0)}$ may be set to either zero or a respective complex value. In an exemplary embodiment, each entry of analog combining matrix $W_{RF,u}$ may include one of zero or a respective complex value with unit magnitude. In other words, in an exemplary embodiment, each entry of analog combining matrix $W_{RF,u}$ may include either zero or a respective complex value with unit magnitude. In an exemplary embodiment, when an $l^{th}$ receive RF chain of plurality of receive RF chains 208 is coupled to a $k^{th}$ receive antenna of plurality of receive antennas 210, a $(k, l)^{th}$ entry of analog combining matrix $W_{RF,u}$ may include a complex value with unit magnitude. In an exemplary embodiment, when the $l^{th}$ receive RF chain is not coupled to the $k^{th}$ receive antenna, the $(k, l)^{th}$ entry may include a zero value. An exemplary complex value may include a unit amplitude and a random phase. In an exemplary embodiment, RF combining matrix $\overline{W}_{RF}^{(0)}$ may include an initialization of the first iterative process.

Figure 1E:
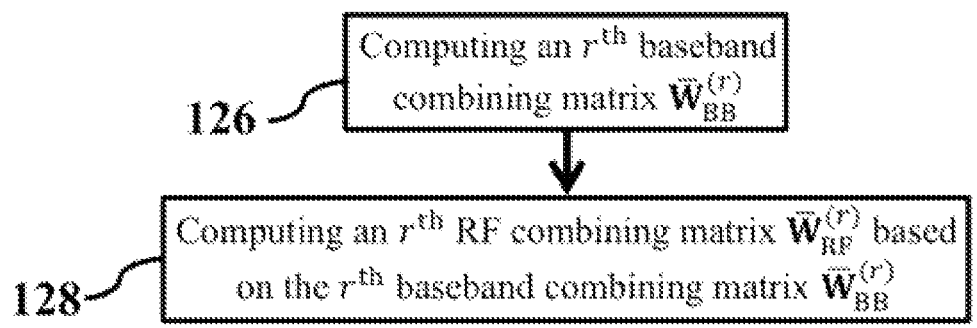
FIG. 1E shows a flowchart for a first iterative process, consistent with one or more exemplary embodiments of the present disclosure.

For further detail with respect to step 124, FIG. 1E shows a flowchart for a first iterative process, consistent with one or more exemplary embodiments of the present disclosure. In an exemplary embodiment, an $r^{th}$ iteration of the first iterative process may include computing a baseband combining matrix $\overline{W}_{BB}^{(r)}$ (step 126) and computing an RF combining matrix $\overline{W}_{RF}^{(r)}$ (step 128) where $r \geq 1$ is an integer.

In further detail with regard to step 126, in an exemplary embodiment, baseband combining matrix $\overline{W}_{BB}^{(r)}$ may include a least squared solution to a minimization of the first Euclidean distance. In an exemplary embodiment, baseband combining matrix $\overline{W}_{BB}^{(r)}$ may be computed by the following:

$$\overline{W}_{BB}^{(r)} = (\overline{W}_{RF}^{(r-1)H} \overline{W}_{RF}^{(r-1)})^{-1} \overline{W}_{RF}^{(r-1)H} V_F \qquad \text{Equation (1)}$$

Figure 2C:
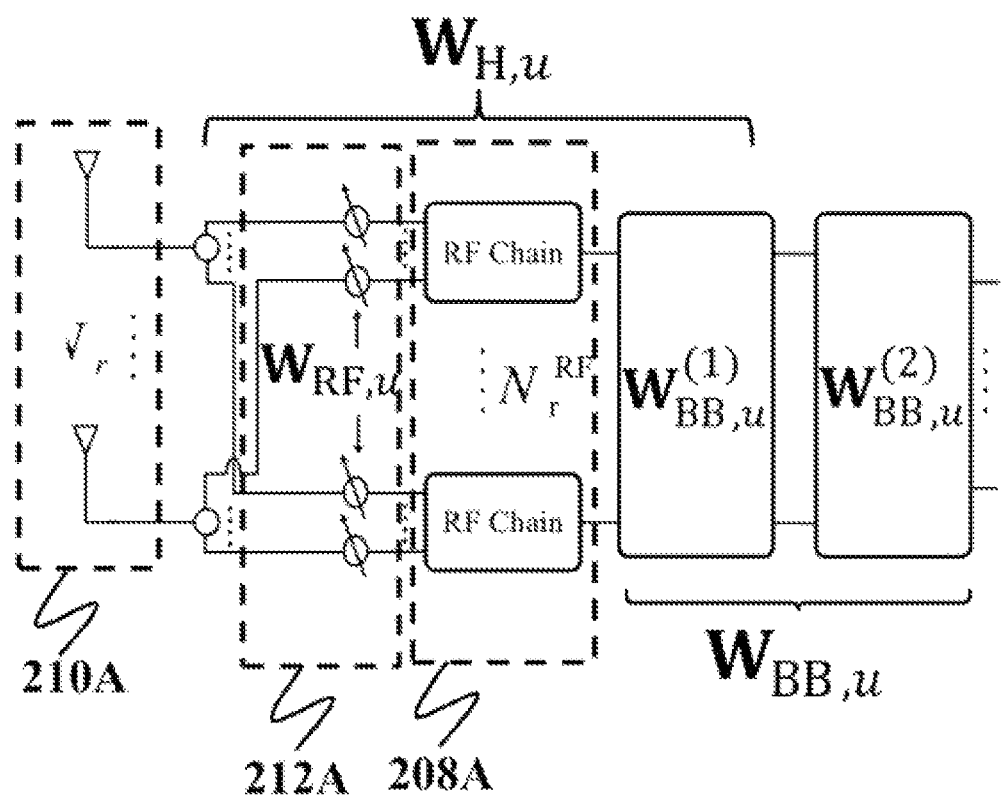
FIG. 2C shows a schematic of a first implementation of a user equipment, consistent with one or more exemplary embodiments of the present disclosure.

For further detail regarding step 128, FIG. 2C shows a schematic of a first implementation of a user equipment, consistent with one or more exemplary embodiments of the present disclosure. In an exemplary embodiment, a UE 206A may include a first implementation of UE 206. In an exemplary embodiment, UE 206A may include a $u^{th}$ plurality of receive RF chains 208A, a $u^{th}$ plurality of receive antennas 210A, and a $u^{th}$ plurality of receive phase shifters 212A.

Referring to FIGS. 1E and 2C, in an exemplary embodiment, step 128 may include computing RF combining matrix $\overline{W}_{RF}^{(r)}$. In an exemplary embodiment, RF combining matrix $\overline{W}_{RF}^{(r)}$ may be computed by computing a $(k, l)^{th}$ entry of RF combining matrix $\overline{W}_{RF}^{(r)}$. In an exemplary embodiment, computing the $(k, l)^{th}$ entry may include obtaining a phase of the $(k, l)^{th}$ entry by minimizing the first Euclidean distance. In an exemplary embodiment, obtaining a phase of the $(k, l)^{th}$ entry may depend on a structure of plurality of receive RF chains 208A and plurality of receive antennas 210A. In an exemplary embodiment, UE 206A may include a fully connected structure (FCS). In an exemplary embodiment, in FCS, each of plurality of receive RF chains 208A may be coupled to each of plurality of receive antennas 210A through plurality of receive phase shifters 212A. In an exemplary embodiment, for UE 206A, computing the $(k, l)^{th}$ entry may include setting the $(k, l)^{th}$ entry to $e^{-j\angle\beta_{k,l}^{(1)}}$ where $\beta_{k,l}^{(1)}=\Sigma_{n=1}^{N_{r,u}^{RF}}\xi_{k,n}^{*}W_{l,n}\xi_{k,n}=V_{k,n}-\Sigma_{i\ne l}e^{j\varphi_{k,j}}W_{i,n}, V_{k,n}$ is a $(k, n)^{th}$ entry of $V_F$, $W_{l,n}$ is an $(l, n)^{th}$ entry of $\overline{W}_{BB}^{(r)}$, $e^{j\omega_{k,i}}$ is a $(k, i)^{th}$ entry of $\overline{W}_{RF}^{(r-1)}$, and $\angle\alpha$ returns a phase of a complex value $\alpha$.

Figure 2D:
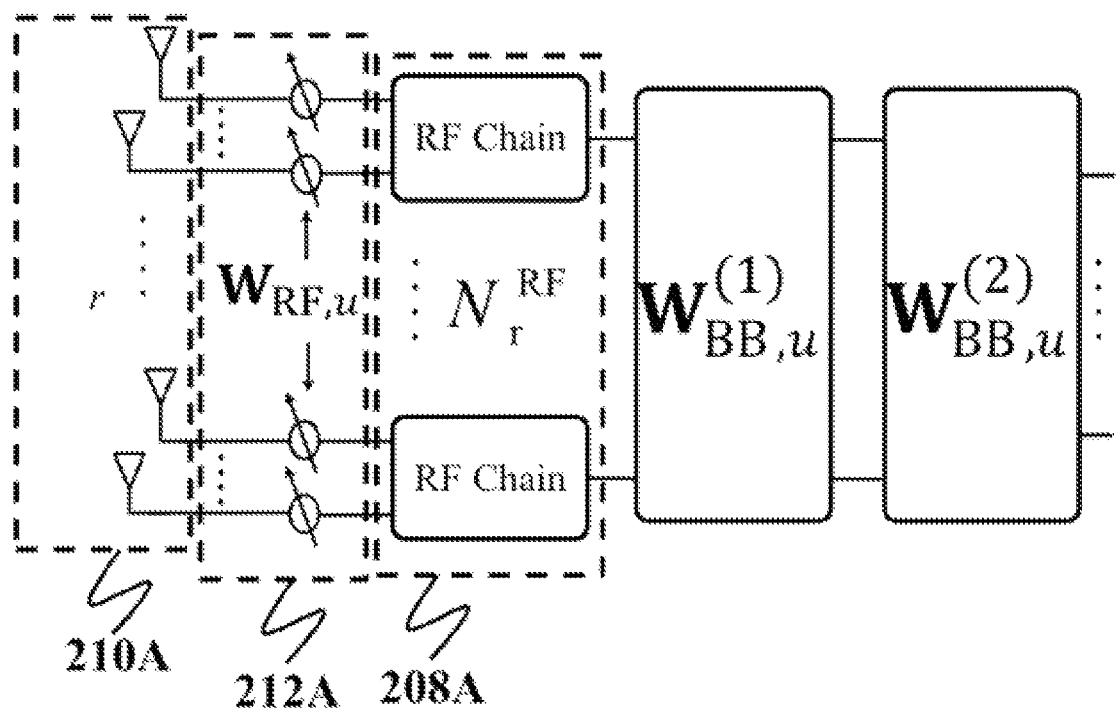
FIG. 2D shows a schematic of a second implementation of a user equipment, consistent with one or more exemplary embodiments of the present disclosure.

In further detail with respect to step 128, FIG. 2D shows a schematic of a second implementation of a user equipment, consistent with one or more exemplary embodiments of the present disclosure. In an exemplary embodiment, a UE 206B may include a second implementation of UE 206. In an exemplary embodiment, UE 206B may include a $u^{th}$ plurality of receive RF chains 208B, a $u^{th}$ plurality of receive antennas 210B, and a $u^{th}$ plurality of receive phase shifters 212B.

In an exemplary embodiment, UE 206B may include a partially connected structure (PCS). In an exemplary embodiment, in PCS, each of plurality of receive RF chains 208B may be coupled to a respective subset of plurality of receive antennas 210B through plurality of receive phase shifters 212B. In an exemplary embodiment, for UE 206B, computing the $(k, l)^{th}$ entry may include setting the $(k, l)^{th}$ entry to $e^{-j\angle\beta_{k,l}^{(2)}}$ where $\beta_{k,l}^{(2)}=\Sigma_{n=1}^{N_{r,u}^{RF}}V_{k,n}^{*}W_{l,n}$.

In an exemplary embodiment, the first iterative process may be continued until a first termination condition is satisfied. In an exemplary embodiment, the first termination condition may be defined by the following:

$$\|\overline{W}_{RF}^{(r-1)}\overline{W}_{BB}^{(r-1)}-V_F\|_F - \|\overline{W}_{RF}^{(r)}\overline{W}_{BB}^{(r)}-V_F\|_F \le \in_W \quad \text{Inequation (1)}$$

where $\in_W$ is a first threshold. In an exemplary embodiment, hybrid combining matrix $W_{H,u}$ may be equal to $\overline{W}_{RF}^{(r_1)}\overline{W}_{BB}^{(r_1)}$ where $r_1$ is a total number of iterations of the first iterative process when the first termination condition is satisfied. In an exemplary embodiment, analog combining matrix $W_{RF,u}$ may be equal to $\overline{W}_{RF}^{(r_1)}$. In an exemplary embodiment, digital combining matrix $W_{BB,u}^{(1)}$ may be equal to $\overline{W}_{BB}^{(r_1)}$.

Figure 2E:
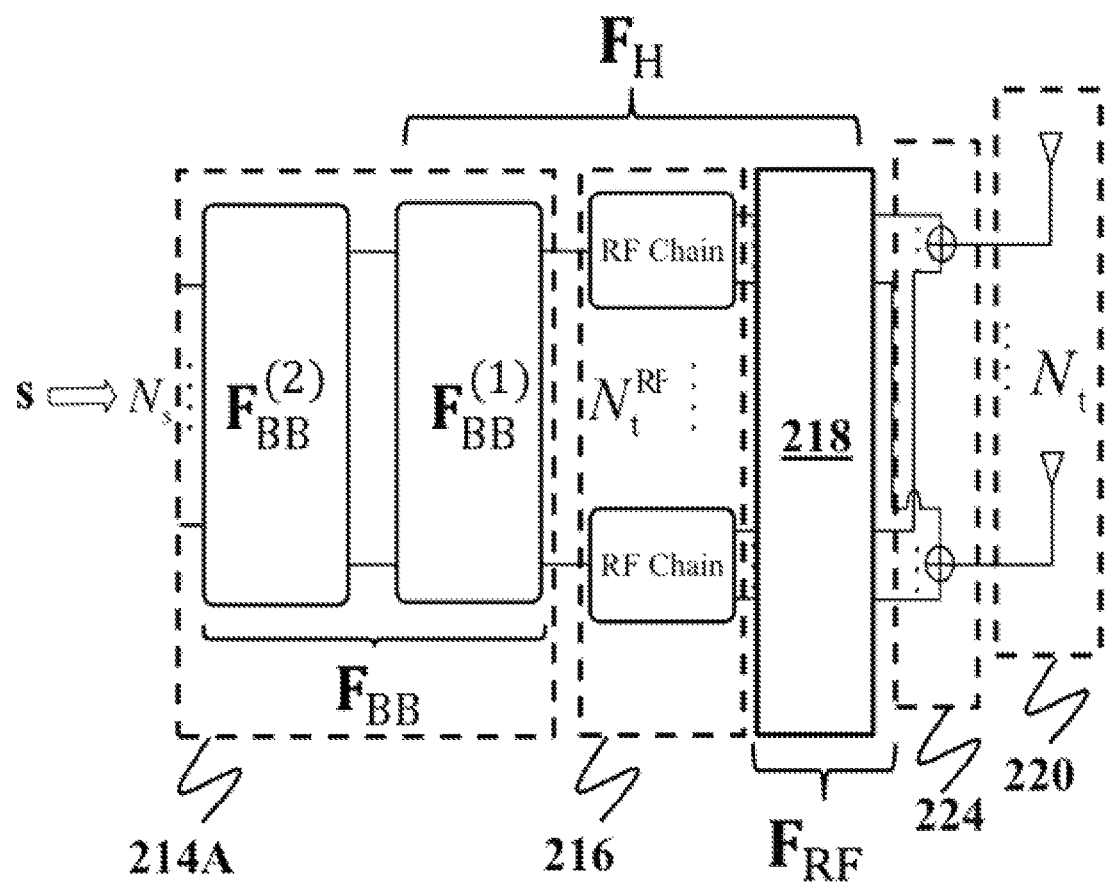
FIG. 2E shows a schematic of an overview of a base station, consistent with one or more exemplary embodiments of the present disclosure.

Referring again to FIG. 1C, in an exemplary embodiment, step 120 may include generating hybrid precoding matrix $F_H$. For further detail with respect to step 120, FIG. 2E shows a schematic of an overview of a base station, consistent with one or more exemplary embodiments of the present disclosure. In an exemplary embodiment, BS 202 may include a processor 214A, a plurality of transmit RF chains 216, a plurality of transmit phase shifters 218, and a plurality of transmit antennas 220.

In an exemplary embodiment, hybrid precoding matrix $F_H$ may be generated by utilizing processor 214A. In an exemplary embodiment, hybrid precoding matrix $F_H$ may be generated based on a plurality of dominant right eigenvectors of a first effective channel matrix. In an exemplary embodiment, the first effective channel matrix may be equal to $W_{mu}H_{mu}$ where $H_{mu}=[H_1^T \ldots H_U^T]^T$ and $W_{mu}$ is a block diagonal matrix. In an exemplary embodiment, a $u^{th}$ diagonal block of $W_{mu}$ may include hybrid combining matrix $W_{H,u}$. In an exemplary embodiment, hybrid precoding matrix $F_H$ may include a product of a digital precoding matrix $F_{BB}^{(1)}$ and an analog precoding matrix $F_{RF}$.

In an exemplary embodiment, hybrid precoding matrix $F_H$ may be generated by approximating a plurality of dominant right eigenvectors of the first effective channel matrix. In an exemplary embodiment, approximating the plurality of dominant right eigenvectors may include minimizing a second Euclidean distance between hybrid precoding matrix $F_H$ and a unitary matrix $V_W$. In an exemplary embodiment, unitary matrix $V_W$ may include the plurality of dominant right eigenvectors. In an exemplary embodiment, minimizing the second Euclidean distance may include minimizing $\|F_{RF}F_{BB}^{(1)}-V_W\|_F^2$.

Figure 1F:
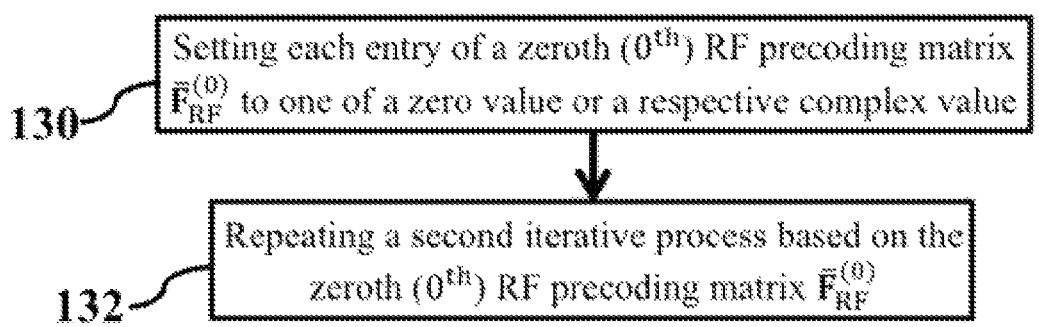
FIG. 1F shows a flowchart for generating a hybrid precoding matrix, consistent with one or more exemplary embodiments of the present disclosure.

In exemplary embodiment, step 120 may include generating hybrid precoding matrix $F_H$. FIG. 1F shows a flowchart for generating a hybrid precoding matrix, consistent with one or more exemplary embodiments of the present disclosure. In an exemplary embodiment, generating hybrid precoding matrix $F_H$ may include setting each entry of a RF precoding matrix $\overline{F}_{RF}^{(0)}$ to one of zero or a respective complex value (step 130), and repeating a second iterative process based on RF precoding matrix $\overline{F}_{RF}^{(0)}$ (step 132).

Referring to FIGS. 1F and 2E, in an exemplary embodiment, step 130 may include setting each entry of an RF precoding matrix $\overline{F}_{RF}^{(0)}$ to one of zero or a respective complex value. In other words, in an exemplary embodiment, each entry of RF precoding matrix $\overline{F}_{RF}^{(0)}$ may be set to either zero or a respective complex value. In an exemplary embodiment, each entry of analog precoding matrix $F_{RF}$ may include one of zero or a respective complex value with unit magnitude. In other words, in an exemplary embodiment, each entry of analog precoding matrix $F_{RF}$ may include either zero or a respective complex value with unit magnitude. In an exemplary embodiment, when an $s^{th}$ transmit RF chain of plurality of transmit RF chains 216 is coupled to a $q^{th}$ transmit antenna of plurality of transmit antennas 220, a $(q, s)^{th}$ entry of analog precoding matrix $F_{RF}$ may include a complex value with unit magnitude. In an exemplary embodiment, when the $S^{th}$ transmit RF chain is not coupled to the $q^{th}$ transmit antenna, the $(q, s)^{th}$ entry may include a zero value. An exemplary complex value may include a unit amplitude and a random phase. In an exemplary embodiment, RF precoding matrix $\overline{F}_{RF}^{(0)}$ may include an initialization of the second iterative process.

Figure 1G:
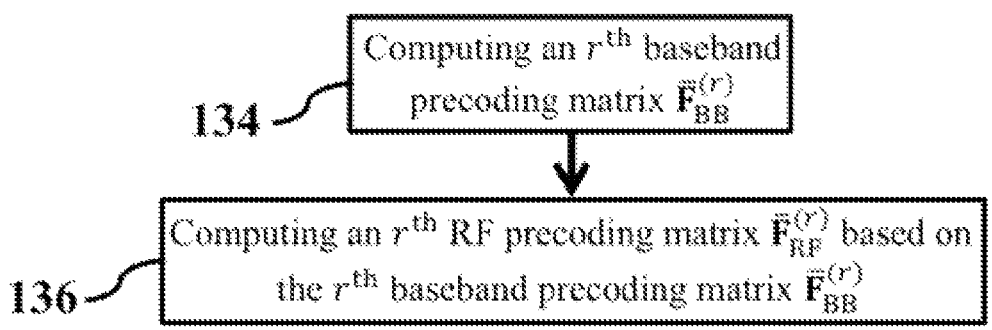
FIG. 1G shows a flowchart for a second iterative process, consistent with one or more exemplary embodiments of the present disclosure.
Figure 1H:
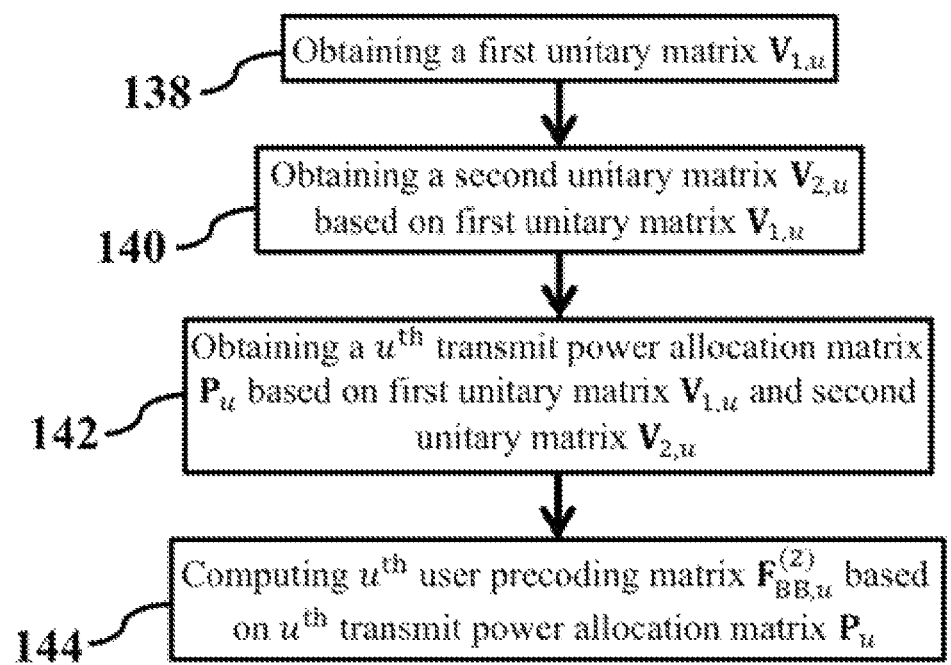
FIG. 1H shows a flowchart of a first method for obtaining a user precoding matrix, consistent with one or more exemplary embodiments of the present disclosure.

For further detail with respect to step 132, FIG. 1G shows a flowchart for a second iterative process, consistent with one or more exemplary embodiments of the present disclosure. In an exemplary embodiment, an $r^{th}$ iteration of the second iterative process may include computing a baseband precoding matrix $F_{BB}^{(r)}$ (step 134) and computing an RF precoding matrix $\overline{F}_{RF}^{(r)}$ (step 136).

In further detail with regard to step 134, in an exemplary embodiment, baseband precoding matrix $F_{BB}^{(r)}$ may include a least squared solution to a minimization of the second Euclidean distance. In an exemplary embodiment, baseband precoding matrix $\overline{F}_{BB}^{(r)}$ may be computed by the following:

$$\overline{F}_{BB}^{(r)} = (\overline{F}_{RF}^{(r-1)H}\overline{F}_{RF}^{(r-1)})^{-1}\overline{F}_{RF}^{(r-1)H}V_W \quad \text{Equation (2)}$$

Figure 2F:
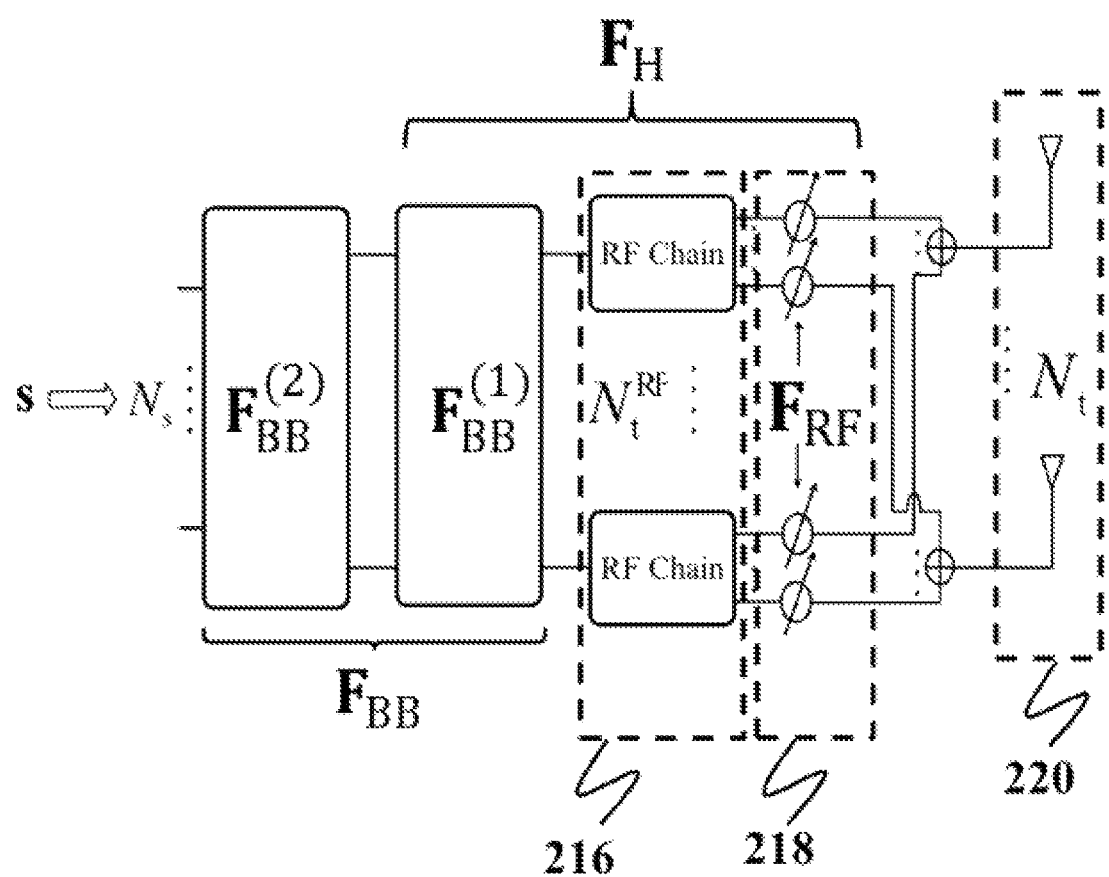
FIG. 2F shows a schematic of a first implementation of a base station, consistent with one or more exemplary embodiments of the present disclosure.

For further detail with regard to step 136, FIG. 2F shows a schematic of a first implementation of a base station, consistent with one or more exemplary embodiments of the present disclosure. In an exemplary embodiment, a BS 202A may include a first implementation of BS 202. In an exemplary embodiment, BS 202A may include a plurality of transmit RF chains 216A, a plurality of transmit phase shifters 218A, and a plurality of transmit antennas 220A.

Referring to FIGS. 1G and 2F, in an exemplary embodiment, step 136 may include computing RF precoding matrix $\overline{F}_{RF}^{(r)}$. In an exemplary embodiment, RF precoding matrix $\overline{F}_{RF}^{(r)}$ may be computed by computing a $(q, s)^{th}$ entry of RF precoding matrix $\overline{F}_{RF}^{(r)}$. In an exemplary embodiment, computing the $(q, s)^{th}$ entry may include obtaining a phase of the $(q, s)^{th}$ entry by minimizing the second Euclidean distance. In an exemplary embodiment, obtaining a phase of the $(q, s)^{th}$ entry may depend on a structure of plurality of transmit RF chains 216A and plurality of transmit antennas 220A. In an exemplary embodiment, BS 202A may include an FCS wherein each of plurality of transmit RF chains 216A may be coupled to each of plurality of transmit antennas 220A through plurality of transmit phase shifters 218A. In an exemplary embodiment, for BS 202A, computing the (q, s)$^{th}$ entry may include setting the (q, s)$^{th}$ entry to $e^{-j\angle\gamma_{q,s}^{(1)}}$ where $\gamma_{q,s}^{(1)} = \sum_{n=1}^{N_t^{RF}} \delta_{q,n}^* F_{s,n} \delta_{q,n} = V_{q,n} - \sum_{i \neq s} e^{j\varphi_{q,i}} F_{i,n}, V_{q,n}$ is a (q, n)$^{th}$ entry of $V_W$, $F_{s,n}$ is an (s, n)$^{th}$ entry of $\overline{F}_{BB}$, and $e^{j\Theta_{q,i}}$ is a (q, i)$^{th}$ entry of $\overline{F}_{RF}^{(r-1)}$.

Figure 2G:
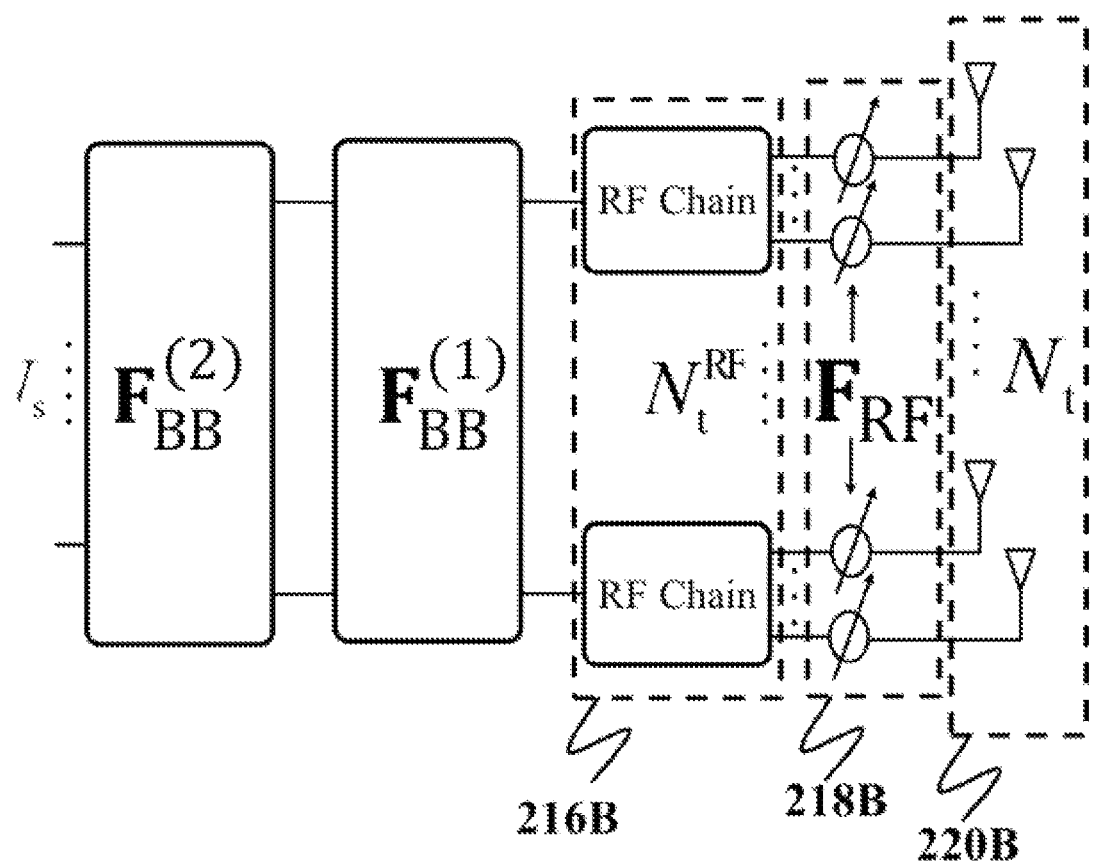
FIG. 2G shows a schematic of a second implementation of a base station, consistent with one or more exemplary embodiments of the present disclosure.

For further detail with regard to step 136, FIG. 2G shows a schematic of a second implementation of a base station, consistent with one or more exemplary embodiments of the present disclosure. In an exemplary embodiment, a BS 202B may include a second implementation of BS 202. In an exemplary embodiment, BS 202B may include a plurality of transmit RF chains 216B, a plurality of transmit antennas 220B, and a plurality of transmit phase shifters 218B.

In an exemplary embodiment, BS 202B may include a PCS wherein each of plurality of transmit RF chains 216B may be coupled to a respective subset of plurality of transmit antennas 220B through plurality of transmit phase shifters 218B. In an exemplary embodiment, for BS 202B, computing the (q, s)$^{th}$ entry may include setting the (q, s)$^{th}$ entry to $e^{-j\angle\gamma_{q,s}^{(2)}}$ where $\gamma_{q,s}^{(2)} = \sum_{n=1}^{N_t^{RF}} V_{q,n}^* F_{s,n}$.

In an exemplary embodiment, the second iterative process may be continued until a second termination condition is satisfied. In an exemplary embodiment, the second termination condition may be defined by the following:

$$\|\overline{F}_{RF}^{(r-1)}\overline{F}_{BB}^{(r-1)} - V_W\|_F - \|\overline{F}_{RF}^{(r)}\overline{F}_{BB}^{(r)} - V_W\|_F \leq \in_F \quad \text{Inequation (2)}$$

where $\in_F$ is a second threshold. In an exemplary embodiment, hybrid combining matrix $F_H$ may be equal to $\overline{F}_{RF}^{(r2)} \overline{F}_{BB}^{(r2)}$ where $r_2$ is a total number of iterations of the second iterative process when the second termination condition is satisfied. In an exemplary embodiment, analog precoding matrix $F_{RF}$ may be equal to $\overline{F}_{RF}^{(r2)}$. In an exemplary embodiment, digital precoding matrix $F_{BB}^{(1)}$ may be equal to $\overline{F}_{BB}^{(r2)}$.

Referring again to FIG. 1B, in an exemplary embodiment, step 110 may include obtaining digital precoding matrix $F_{BB}^{(2)}$. In an exemplary embodiment, obtaining digital precoding matrix $F_{BB}^{(2)}$ may include obtaining a precoding matrix $F_{BB,u}^{(2)}$. In an exemplary embodiment, precoding matrix $F_{BB,u}^{(2)}$ may digitally precode a plurality of symbols intended for UE 206. In an exemplary embodiment, digital precoding matrix $F_{BB}^{(2)}$ may be equal to $[F_{BB,1}^{(2)}, \ldots, F_{BB,U}^{(2)}]$.

Figure 1I:
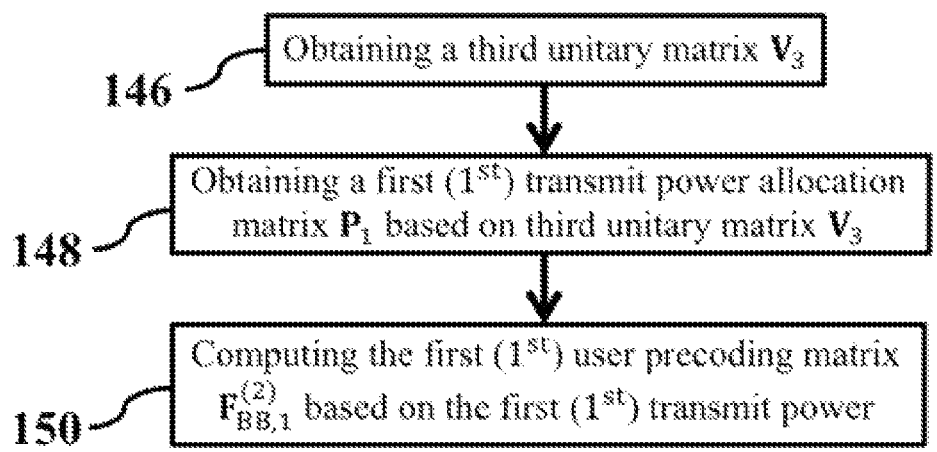
FIG. 1I shows a flowchart of a second method for obtaining a user precoding matrix, consistent with one or more exemplary embodiments of the present disclosure.

For further detail with regard step 110, FIG. 1I1 shows a flowchart of a first method for obtaining a precoding matrix, consistent with one or more exemplary embodiments of the present disclosure. In an exemplary embodiment, method 110A may include a first implementation of step 110. In an exemplary embodiment, method 110A may include obtaining digital precoding matrix $F_{BB}^{(2)}$ for a multi-user MIMO (MU-MIMO) communication system. In an exemplary MU-MIMO communication system, a size of set 204 of UEs may be equal to or greater than two. In an exemplary embodiment, method 110A may be referred to as a block digonalization method. An exemplary block diagonalization method may eliminate an inter-user interference and an inter-symbol interference from a received signal at each UE in set 204 of UEs by obtaining a number of unitary matrices and embedding unitary matrices in user precoding matrix $F_{BB,u}^{(2)}$, as described below.

In an exemplary embodiment, obtaining user precoding matrix $F_{BB,u}^{(2)}$ in method 110A may include obtaining a unitary matrix $V_{1,u}$ (step 138), obtaining a unitary matrix $V_{2,u}$ based on unitary matrix $V_{1,u}$ (step 140), obtaining a transmit power allocation matrix $P_u$ based on unitary matrix $V_{1,u}$ and unitary matrix $V_{2,u}$ (step 142), and computing precoding matrix $F_{BB,u}^{(2)}$ based on transmit power allocation matrix $P_u$ (step 144).

In an exemplary embodiment, step 138 may include obtaining unitary matrix $V_{1,u}$ by setting unitary matrix $V_{1,u}$ to $N_u$ least dominant right eigenvectors of an interference channel $\overline{H}_u$ where $N_u$ is a number of symbols transmitted to UE 206. In an exemplary embodiment, interference channel $\overline{H}_u$ may be equal to $[H_{eff,1}^T, \ldots H_{eff,u-1}^T, H_{eff,u+1}^T, \ldots, H_{eff,U}^T]^T$ where $H_{eff,u} = W_{H,u}^H H_u F_H$, $R_{\tilde{n},u} = W_{H,u}^H R_{n,u} W_{H,u}$, $R_{n,u}$ is a covariance matrix of a noise vector at UE 206, and U>1. In an exemplary embodiment, embedding unitary matrix $V_{1,u}$ in precoding matrix $F_{BB,u}^{(2)}$ may eliminate an inter-user interference from a received signal at each UE in set 204 of UEs.

In an exemplary embodiment, step 140 may include obtaining unitary matrix $V_{2,u}$ by setting unitary matrix $V_{2,u}$ to a plurality of right eigenvectors of $$R_{\tilde{n},u}^{-\frac{1}{2}} H_{eff,u} V_{1,u}.$$

In an exemplary embodiment, embedding unitary matrix $V_{2,u}$ in precoding matrix $F_{BB,u}^{(2)}$ may eliminate an inter-symbol interference from a received signal at each UE in set 204 of UEs.

In an exemplary embodiment, step 142 may include obtaining transmit power allocation matrix $P_u$. In an exemplary embodiment, transmit power allocation matrix $P_u$ may include a diagonal matrix. In an exemplary embodiment, each diagonal entry of transmit power allocation matrix $P_u$ may include a respective non-negative value.

In an exemplary embodiment, obtaining transmit power allocation matrix $P_u$ may include computing a $k^{th}$ diagonal entry $p_{u,k}$ of $u^{th}$ transmit power allocation matrix $P_u$. In an exemplary embodiment, $k^{th}$ diagonal entry $p_{u,k}$ may be obtained by one of a first operation or a second operation. In other words, in an exemplary embodiment, $k^{th}$ diagonal entry $p_{u,k}$ may be obtained by either a first operation or a second operation.

In an exemplary embodiment, obtaining $k^{th}$ diagonal entry $p_{u,k}$ by performing the first operation may minimize a transmit power of BS 202 when an MSE of each symbol is less than a respective maximum acceptable value. In an exemplary embodiment, the first operation may be defined by the following:

$$p_{u,k} = 1/\lambda_{u,k}^{-1}(\rho_{u,k}^{-1} - 1) \quad \text{Equation (3)}$$

where $\lambda_{u,k}$ is a $k^{th}$ dominant eigenvalue of $$R_{\tilde{n},u}^{-\frac{1}{2}} H_{eff,u} V_{1,u},$$

and $\rho_{u,k}$ is a $k^{th}$ maximum acceptable MSE of UE 206. In an exemplary embodiment, BS 202 may obtain $k^{th}$ diagonal entry $p_{u,k}$ by performing the first operation. Then, in an exemplary embodiment, BS 202 may embed $k^{th}$ diagonal entry $p_{u,k}$ into transmit power allocation matrix $p_u$, and process a plurality of transmit symbols by transmit power allocation matrix $P_u$.

In an exemplary embodiment, obtaining $k^{th}$ diagonal entry $p_{u,k}$ by performing the second operation may minimize a sum-MSE of transmit symbols when the transmit power is less than a power budget of BS 202. In an exemplary embodiment, the second operation may be defined by the following:

$$p_{u,k} = \max\left(\mu\lambda_{u,k}^{-\frac{1}{2}} - \lambda_{u,k}^{-1}, 0\right) \quad \text{Equation (4)}$$

where $\mu$ satisfies a condition according to $$\Sigma_{u=1}^{U}\Sigma_{k=1}^{N_s}\max\left(\mu\lambda_{u,k}^{-\frac{1}{2}} - \lambda_{u,k}^{-1}, 0\right) = P_{max},$$

and $P_{max}$ is a power budget of BS 202. In an exemplary embodiment, BS 202 may obtain $k^{th}$ diagonal entry $p_{u,k}$ by performing the second operation. Then, in an exemplary embodiment, BS 202 may embed $k^{th}$ diagonal entry $p_{u,k}$ into transmit power allocation matrix $P_u$, and process a plurality of transmit symbols by transmit power allocation matrix $P_u$.

In an exemplary embodiment, step 144 may include computing precoding matrix $F_{BB,u}^{(2)}$. In an exemplary embodiment, precoding matrix $F_{BB,u}^{(2)}$ may be computed according to an operation defined by $$F_{BB,u}^{(2)} = V_{1,u}V_{2,u}P_u^{\frac{1}{2}} \quad \text{where } A^{\frac{1}{2}}$$

is a square root of a square matrix A.

Referring again to FIG. 1B, in an exemplary embodiment, step 110 may include obtaining digital precoding matrix $F_{BB}^{(2)}$. For Further detail with respect to step 110, FIG. 1I shows a flowchart of a second method for obtaining a user precoding matrix, consistent with one or more exemplary embodiments of the present disclosure. In an exemplary embodiment, method 110B may include a second implementation of step 110. In an exemplary embodiment, method 110B may obtain digital precoding matrix $F_{BB}^{(2)}$ for a single-user MIMO (SU-MIMO) communication system. In an exemplary SU-MIMO communication system, a size of set 204 of UEs may be equal to one. In an exemplary embodiment, method 110B may include a channel digonalization method. An exemplary channel diagonalization method may eliminate an inter-symbol interference from a received signal at a first ($1^{st}$) UE 222 in set 204 of UEs. In an exemplary embodiment, method 110B may include obtaining a precoding matrix $F_{BB,1}^{(2)}$. In an exemplary embodiment, in a SU-MIMO, digital precoding matrix $F_{BB}^{(2)}$ may be equal to precoding matrix $F_{BB,1}^{(2)}$.

In an exemplary embodiment, obtaining precoding matrix $F_{BB,1}^{(2)}$ in method 110B may include obtaining a unitary matrix $V_3$ (step 146), obtaining a transmit power allocation matrix $P_1$ based on unitary matrix $V_3$ (step 148), and computing precoding matrix $F_{BB,1}^{(2)}$ based on transmit power allocation matrix $P_1$ (step 150).

In an exemplary embodiment, step 146 may include obtaining unitary matrix $V_3$ by setting unitary matrix $V_3$ to a plurality of right eigenvectors of $$R_{\tilde{n},1}^{-\frac{1}{2}}H_{eff,1}.$$

In an exemplary embodiment, embedding unitary matrix $V_3$ in precoding matrix $F_{BB,1}^{(2)}$ may eliminate an inter-symbol interference from a received signal at UE 222.

In an exemplary embodiment, step 148 may include obtaining transmit power allocation matrix $P_1$. In an exemplary embodiment, transmit power allocation matrix $P_1$ may include a diagonal matrix. In an exemplary embodiment, each diagonal entry of transmit power allocation matrix $P_1$ may include a respective non-negative value.

In an exemplary embodiment, obtaining transmit power allocation matrix $P_1$ may include computing a $k^{th}$ diagonal entry $p_{1,k}$ of transmit power allocation matrix $P_1$. In an exemplary embodiment, $k^{th}$ diagonal entry $p_{1,k}$ may be obtained by one of a third operation or a fourth operation. In other words, in an exemplary embodiment, $k^{th}$ diagonal entry $p_{1,k}$ may be obtained by either a third operation or a fourth operation.

In an exemplary embodiment, obtaining $k^{th}$ diagonal entry $p_{1,k}$ by performing the third operation may minimize a transmit power of BS 202 when an MSE of each symbol is less than a respective maximum acceptable value. In an exemplary embodiment, the third operation may be defined by the following:

$$p_{1,k} = 1/\lambda_{1,k}^{-1}(\rho_{1,k}^{-1} - 1) \quad \text{Equation (5)}$$

where $\lambda_{1,k}$ is a $k^{th}$ dominant eigenvalue of $$R_{\tilde{n},1}^{-\frac{1}{2}}H_{eff,1}$$

and $\rho_{1,k}$ is a $k^{th}$ maximum acceptable MSE of UE 222. In an exemplary embodiment, BS 202 may obtain $k^{th}$ diagonal entry $p_{1,k}$ by performing the third operation. Then, in an exemplary embodiment, BS 202 may embed $k^{th}$ diagonal entry $p_{1,k}$ into transmit power allocation matrix $P_1$, and process a plurality of transmit symbols by transmit power allocation matrix $P_1$.

In an exemplary embodiment, obtaining $k^{th}$ diagonal entry $p_{1,k}$ by performing the fourth operation may minimize a sum-MSE of transmitted symbols when the transmit power is less than a power budget of BS 202. In an exemplary embodiment, the fourth operation may be defined by the following:

$$p_{1,k} = \max\left(\mu\lambda_{1,k}^{-\frac{1}{2}} - \lambda_{1,k}^{-1}, 0\right) \quad \text{Equation (6)}$$

where $\mu$ satisfies a condition according to $$\Sigma_{k=1}^{N_s}\max\left(\mu\lambda_{1,k}^{-\frac{1}{2}} - \lambda_{1,k}^{-1}, 0\right) = P_{max}.$$

In an exemplary embodiment, BS 202 may obtain $k^{th}$ diagonal entry $p_{1,k}$ by performing the fourth operation. Then, in an exemplary embodiment, BS 202 may embed $k^{th}$ diagonal entry $p_{1,k}$ into transmit power allocation matrix $P_1$, and process a plurality of transmit symbols by transmit power allocation matrix $P_1$.

In an exemplary embodiment, step 150 may include computing precoding matrix $F_{BB,1}^{(2)}$. In an exemplary embodiment, precoding matrix $F_{BB,1}^{(2)}$ may be computed according to an operation defined by $$F_{BB,u}^{(2)} = V_3 P_1^{\frac{1}{2}}.$$

In an exemplary embodiment, precoding matrix $F_{BB,1}^{(2)}$ may be equal to digital precoding matrix $F_{BB}^{(2)}$.

Referring again to FIGS. 1B, 2A, 2C and 2D, in an exemplary embodiment, step 112 may include obtaining the plurality of digitally precoded symbols. In an exemplary embodiment, the plurality of digitally precoded symbols may be obtained by utilizing processor 214A. In an exemplary embodiment, the plurality of digitally precoded symbols may be obtained by multiplying a transmit vector by a digital precoding matrix $F_{BB}$. An exemplary transmit vector may include a plurality of transmit symbols. In an exemplary embodiment, the plurality of transmit symbols may include a subset of transmit symbols intended for transmission to UE 206. In an exemplary embodiment, digital precoding matrix $F_{BB}$ may be equal to $F_{BB}^{(1)} F_{BB}^{(2)}$. In an exemplary embodiment, digital precoding matrix $F_{BB}$ may be implemented by a digital precoder. An exemplary digital precoder may be implemented by utilizing processor 214A.

In an exemplary embodiment, step 114 may include obtaining the plurality of frequency-upconverted signals. In an exemplary embodiment, the plurality of frequency-upconverted signals may be obtained by utilizing plurality of transmit RF chains 216. In an exemplary embodiment, plurality of transmit RF chains 216 may be coupled to processor 214A. In an exemplary embodiment, an $s^{th}$ frequency-upconverted signal of the plurality of frequency-upconverted signals may be obtained by feeding an $s^{th}$ digitally precoded symbol of the plurality of digitally precoded symbols to an input of an $s^{th}$ transmit RF chain of plurality of transmit RF chains 216. In an exemplary embodiment, plurality of transmit RF chains 216 may be configured to convert a frequency band of the plurality of digitally precoded symbols from baseband to a microwave frequency band. In an exemplary embodiment, an amplitude and a phase of the $s^{th}$ frequency-upconverted signal may be equal to an amplitude and phase of the $s^{th}$ digitally precoded symbol. In other words, in an exemplary embodiment, the $s^{th}$ transmit RF chain may not change an amplitude and a phase of the $s^{th}$ digitally precoded symbol.

In an exemplary embodiment, each of plurality of transmit RF chains 216 may include a digital to analog converter (DAC) and a frequency upconverter. An exemplary DAC may convert a digital symbol to a baseband analog signal. An exemplary upconverter may convert a frequency band of an input signal with a lower frequency to an output signal with a higher frequency.

For a signal recovery of N symbols, a system of linear equations with at least N equations may be required. In an exemplary embodiment, a number $N_t^{RF}$ of plurality of transmit RF chains 216 may determine a number of linear equations for estimating a number of transmitted symbols. As a result, in an exemplary embodiment, the number of plurality of transmit RF chains 216 may satisfy a condition $N_t^{RF} \geq N_s$ where $N_s$ is a number of the plurality of transmit symbols.

In an exemplary embodiment, step 116 may include generating the plurality of transmit phase shifted signals. In an exemplary embodiment, the plurality of transmit phase shifted signals may be generated by utilizing plurality of transmit phase shifters 218. In an exemplary embodiment, the plurality of transmit phase shifted signals may be generated by phase shifting the plurality of frequency-upconverted signals based on analog precoding matrix $F_{RF}$. In an exemplary embodiment, each transmit RF chain of plurality of transmit RF chains 216 may be coupled to a respective subset of plurality of transmit phase shifters 218 through a power splitter. As a result, in an exemplary embodiment, each of the plurality of frequency-upconverted signals may be phase shifted by a respective subset of plurality of transmit phase shifters 218. In an exemplary embodiment, a $(q, s)^{th}$ transmit phase shifter of plurality of transmit phase shifters 218 may be coupled to the $s^{th}$ transmit RF chain and a $q^{th}$ transmit antenna of plurality of transmit antennas 220. In an exemplary embodiment, a phase shift of the $(q, s)^{th}$ transmit phase shifter may be equal to a phase of a $(q, s)^{th}$ entry of analog precoding matrix $F_{RF}$. In an exemplary embodiment, a phase shift of a $(q, s)^{th}$ transmit phase shifter of plurality of transmit phase shifters 218A may be equal to $-\angle \gamma_{q,s}^{(1)}$. In an exemplary embodiment, a phase shift of a $(q, s)^{th}$ transmit phase shifter of plurality of transmit phase shifters 218B may be equal to $-\angle \gamma_{q,s}^{(2)}$.

In an exemplary embodiment, each of plurality of transmit phase shifters 218A may include a quantized phase shifter. In an exemplary embodiment, a phase shift of a $(q, s)^{th}$ phase shifter of plurality of transmit phase shifters 218A may be equal to a nearest quantization level) to $-\angle \gamma_{q,s}^{(1)}$. In an exemplary embodiment, each of plurality of transmit phase shifters 218B may include a quantized phase shifter. In an exemplary embodiment, a phase shift of a $(q, s)^{th}$ phase shifter of plurality of transmit phase shifters 218B may be equal to a nearest quantization level to $-\angle \gamma_{q,s}^{(2)}$.

Referring again to FIGS. 1A, 2A, and 2E in an exemplary embodiment, step 104 may include obtaining the plurality of transmit signals. In an exemplary embodiment, BS 202 may further include a plurality of power combiners 224. In an exemplary embodiment, plurality of transmit phase shifters 218 may be coupled to plurality of transmit antennas 220 through plurality of power combiners 224. In an exemplary embodiment, each of plurality of power combiners 224 may be coupled to each of plurality of transmit RF chains 216. As a result, in an exemplary embodiment, each of the plurality of transmit phase shifted signals may be fed to a respective power combiner of the plurality of power combiners. In an exemplary embodiment, an output of a $q^{th}$ power combiner of plurality of power combiners 224 may include a $q^{th}$ transmit signal of the plurality of transmit signals.

In an exemplary embodiment, step 106 may include transmitting the plurality of transmit signals to a set 226 of wireless channels. In an exemplary embodiment, the plurality of transmit signals may be transmitted by utilizing plurality of transmit antennas 220. In an exemplary embodiment, each of plurality of transmit antennas 220 may include a respective power amplifier. In an exemplary embodiment, a power amplifier may amplify an input signal before transmission.

In an exemplary embodiment, the plurality of transmit signals may be transmitted to UE 206 through a $u^{th}$ wireless channel 228 in set 226 of wireless channels. In an exemplary embodiment, channel matrix $H_u$ may include a gain matrix of wireless channel 228.

In hybrid digital-analog beamforming, a number of RF chains may be smaller than a number of antennas. When a number of RF chains is smaller than a number of antennas in a massive MIMO system, a power consumption and a cost of RF chains may decrease. As a result, in an exemplary embodiment, a number $N_t$ of plurality of transmit antennas 220 may satisfy a condition $N_t^{RF} < N_t$.

In an exemplary embodiment, method 100 may further include obtaining a $u^{th}$ plurality of estimated symbols (step 152). In an exemplary embodiment, the $u^{th}$ plurality of estimated symbols may include estimated symbols of a subset of the plurality of transmit symbols intended for transmission to UE 206.

Figure 1J:
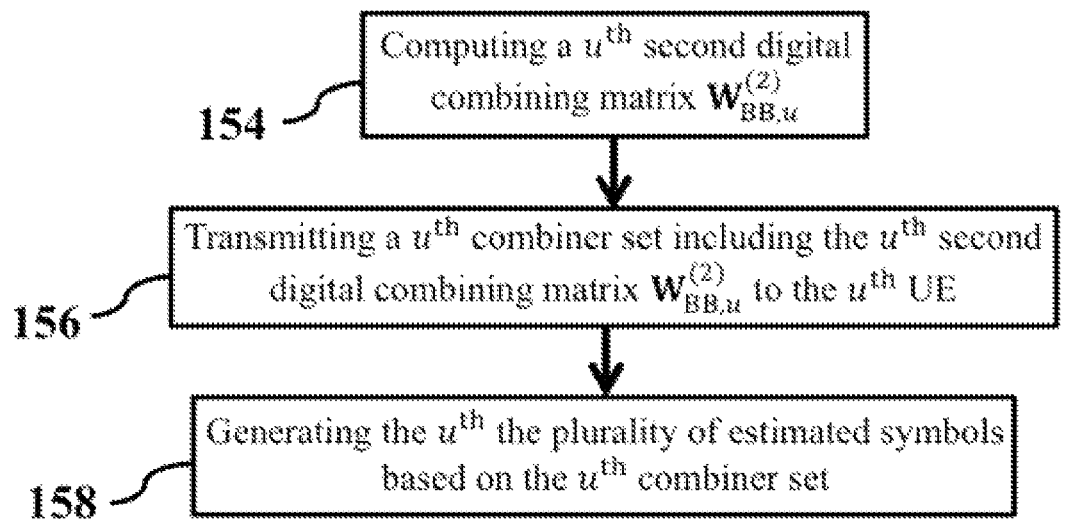
FIG. 1J shows a flowchart of a method for obtaining a plurality of estimated symbols, consistent with one or more exemplary embodiments of the present disclosure.

For further detail with respect to step 152, FIG. 1J shows a flowchart of a method for obtaining a plurality of estimated symbols, consistent with one or more exemplary embodiments of the present disclosure. In an exemplary embodiment, obtaining the $u^{th}$ plurality of estimated symbols may include computing a digital combining matrix $W_{BB,u}^{(2)}$ (step 154), transmitting a $u^{th}$ combiner set including digital combining matrix $W_{BB,u}^{(2)}$ to UE 206 (step 156), and generating the $u^{th}$ plurality of estimated symbols based on the $u^{th}$ combiner set (step 158).

In an exemplary embodiment, step 154 may include computing digital combining matrix $W_{BB,u}^{(2)}$. In an exemplary embodiment, digital combining matrix $W_{BB,u}^{(2)}$ may include an MMSE combiner. In an exemplary embodiment, MMSE combiner may minimize an MSE of estimation of different data streams received by UE 206. In an exemplary embodiment, the $u^{th}$ plurality of estimated symbols may be obtained according to an operation defined by the following:

$$W_{BB,u}^{(2)} = (H_{eff,u} F_{BB,u}^{(2)} F_{BB,u}^{(2)H} H_{eff,u}^{H} + R_{\tilde{n},u})^{-1} H_{eff,u} F_{BB,u}^{(2)}$$ Equation (7)

In an exemplary embodiment, step 156 may include transmitting the $u^{th}$ combiner set to UE 206. In an exemplary embodiment, UE 206 may require digital combining matrix $W_{BB,u}^{(1)}$, digital combining matrix $W_{BB,u}^{(2)}$, and analog combining matrix $W_{RF,u}$ for obtaining the $u^{th}$ plurality of estimated symbols. In an exemplary embodiment, the $u^{th}$ combiner set may include digital combining matrix $W_{BB,u}^{(1)}$, digital combining matrix $W_{BB,u}^{(2)}$, and analog combining matrix $W_{RF,u}$. In an exemplary embodiment, BS 202 may provide UE 206 with the $u^{th}$ combiner set by transmitting the $u^{th}$ combiner set to UE 206. In an exemplary embodiment, BS 202 may transmit the $u^{th}$ combiner set over a control channel between BS 202 and UE 206.

Figure 1K:
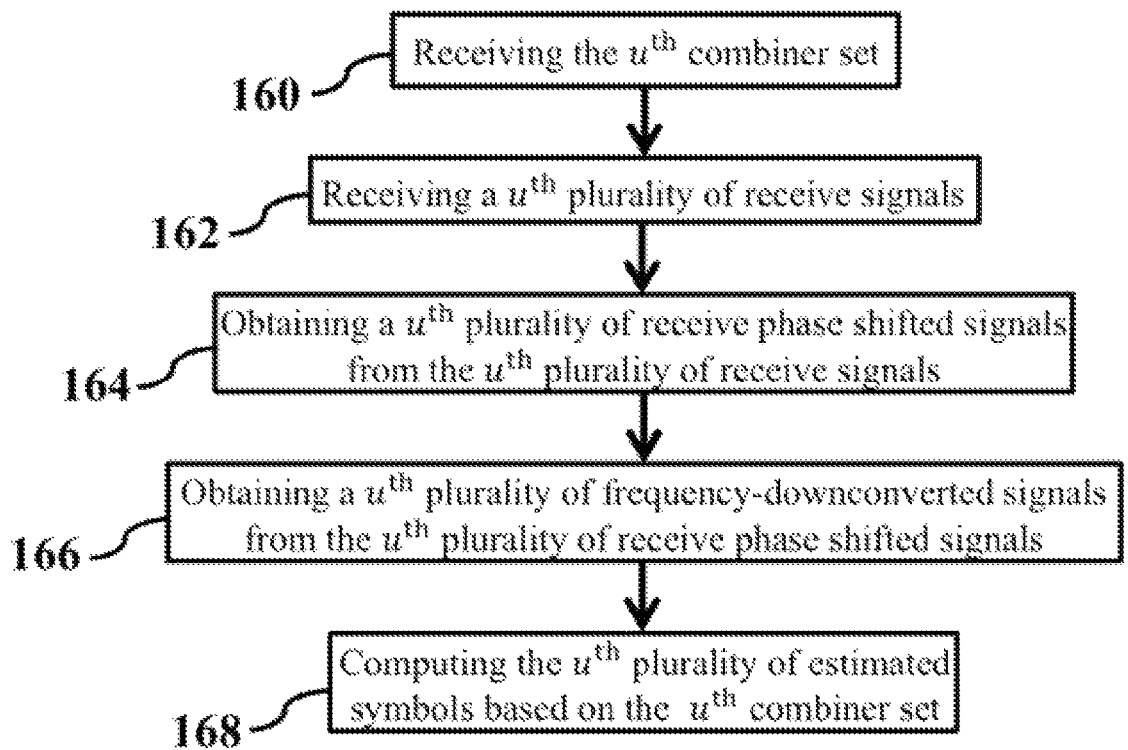
FIG. 1K shows a flowchart of a method for generating a plurality of estimated symbols, consistent with one or more exemplary embodiments of the present disclosure.

In further detail regarding step 158, FIG. 1K shows a flowchart of a method for generating a plurality of estimated symbols, consistent with one or more exemplary embodiments of the present disclosure. In an exemplary embodiment, generating the $u^{th}$ plurality of estimated symbols may include receiving the $u^{th}$ combiner set (step 160), receiving a $u^{th}$ plurality of receive signals (step 162), obtaining a $u^{th}$ plurality of receive phase shifted signals based on the $u^{th}$ plurality of receive signals (step 164), obtaining a $u^{th}$ plurality of frequency-downconverted signals from the $u^{th}$ plurality of receive phase shifted signals (step 166), and computing the $u^{th}$ plurality of estimated symbols based on the $u^{th}$ combiner set (step 168). In an exemplary embodiment, the $u^{th}$ plurality of estimated symbols may be generated by UE 206.

Referring to FIGS. 1K, 2A, and 2B, in an exemplary embodiment, step 160 may include receiving the $u^{th}$ combiner set. In an exemplary embodiment, the $u^{th}$ combiner set may be received by UE 206. In an exemplary embodiment, UE 206 may receive the $u^{th}$ combiner set from the control channel. In an exemplary embodiment, UE 206 may utilize the $u^{th}$ combiner set to generate the $u^{th}$ plurality of estimated symbols.

In an exemplary embodiment, step 162 may include receiving the $u^{th}$ plurality of receive signals. In an exemplary embodiment, UE 206 may further include a $u^{th}$ plurality of power splitters 230. In an exemplary embodiment, the $u^{th}$ plurality of receive signals may be received by utilizing plurality of receive antennas 210. In an exemplary embodiment, the $u^{th}$ plurality of receive signals may be received from wireless channel 228. In an exemplary embodiment, the $u^{th}$ plurality of receive signals may be equal to $H_u s + n_u$ where s is a vector including the plurality of transmit signals and $n_u$ is a noise vector received by $u^{th}$ plurality of receive antennas 210. In an exemplary embodiment, the $u^{th}$ plurality of receive signals may be fed to plurality of receive phase shifters 212 through plurality of power splitters 230. In an exemplary embodiment, each of plurality of power splitters 230 may couple a respective receive antennas of plurality of receive antennas 210 to each of plurality of receive RF chains 208.

In an exemplary embodiment, step 164 may include obtaining the $u^{th}$ plurality of receive phase shifted signals. In an exemplary embodiment, the $u^{th}$ plurality of receive phase shifted signals may be obtained by utilizing plurality of receive phase shifters 212. In an exemplary embodiment, the $u^{th}$ plurality of receive phase shifted signals may be obtained by phase shifting the $u^{th}$ plurality of receive signals based on analog combining matrix $W_{RF}$. In an exemplary embodiment, each of plurality of receive RF chains 208 may be coupled to a respective subset of plurality of receive phase shifters 212 through a respective power combiner. As a result, in an exemplary embodiment, each of the $u^{th}$ plurality of receive signals may be phase shifted by a respective subset of plurality of receive phase shifters 212. In an exemplary embodiment, a $(k, l)^{th}$ receive phase shifter of plurality of receive phase shifters 212 may be coupled to the $l^{th}$ receive RF chain and a $k^{th}$ receive antenna of plurality of receive antennas 210. In an exemplary embodiment, a phase shift of the $(k, l)^{th}$ receive phase shifter may be equal to a phase of a $(k, l)^{th}$ entry of analog combining matrix $W_{RF,u}$. In an exemplary embodiment, a phase shift of a $(k, l)^{th}$ receive phase shifter of plurality of receive phase shifters 212A may be equal to $-\angle \beta_{k,l}^{(1)}$. In an exemplary embodiment, a phase shift of a $(k, l)^{th}$ receive phase shifter of plurality of receive phase shifters 212B may be equal to $-\angle \beta_{k,l}^{(2)}$.

In an exemplary embodiment, each of plurality of receive phase shifters 212A may include a quantized phase shifter. In an exemplary embodiment, a phase shift of a $(k, l)^{th}$ phase shifter of plurality of receive phase shifters 212A may be equal to a nearest quantization level to $-\angle \beta_{k,l}^{(1)}$. In an exemplary embodiment, each of plurality of receive phase shifters 212B may include a quantized phase shifter. In an exemplary embodiment, a phase shift of a $(k, l)^{th}$ phase shifter of plurality of receive phase shifters 212B may be equal to a nearest quantization level to $-\angle \beta_{k,l}^{(2)}$.

In an exemplary embodiment, step 166 may include obtaining the $u^{th}$ plurality of frequency-downconverted signals. In an exemplary embodiment, the $u^{th}$ plurality of frequency-downconverted signals may be obtained by utilizing $u^{th}$ plurality of receive RF chains 208. In an exemplary embodiment, an $l^{th}$ frequency-downconverted signal of the $u^{th}$ plurality of frequency-downconverted signals may be obtained by feeding an $l^{th}$ receive phase shifted signal of the $u^{th}$ plurality of receive phase shifted signals to an input of an $l^{th}$ receive RF chain of plurality of receive RF chains 208. In an exemplary embodiment, plurality of receive RF chains 208 may be configured to convert a frequency band of the $u^{th}$ plurality of receive phase shifted signals from a microwave frequency band to baseband. In an exemplary embodiment, an amplitude and a phase of the $l^{th}$ frequency-downconverted signal may be equal to an amplitude and phase of the $l^{th}$ receive phase shifted signal. In other words, in an exemplary embodiment, the $l^{th}$ receive RF chain may not change an amplitude and a phase of the $l^{th}$ receive phase shifted signal.

In an exemplary embodiment, each of plurality of receive RF chains 208 may include an analog to digital converter (ADC) and a frequency downconverter. An exemplary downconverter may convert a frequency band of an input signal with a higher frequency to an output signal with a lower frequency. An exemplary downconverter may convert a frequency band of a receive phase shifted signal of the $u^{th}$ plurality of receive phase shifted signals to a baseband analog signal. An exemplary ADC may convert a baseband analog signal to a digital symbol.

For a signal recovery of $N_u$ symbols, a system of linear equations with at least $N_u$ equations may be required. In an exemplary embodiment, a number $N_{r,u}^{RF}$ of plurality of receive RF chains 208 may determine a number of linear equations for estimating a subset of the plurality of transmit symbols intended for UE 206. As a result, in an exemplary embodiment, the number of plurality of receive RF chains 208 may satisfy a condition $N_{r,u}^{RF} \geq N_u$ where $N_u$ is a number of the $u^{th}$ plurality of estimated symbols. In an exemplary embodiment, UE 206 may perform hybrid digital-analog beamforming. As a result, in an exemplary embodiment, a number of plurality of receive RF chains 208 may be smaller than a number of plurality of receive antennas 210, that is, $N_{r,u}^{RF} < N_{r,u}$.

In an exemplary embodiment, step 168 may include computing the $u^{th}$ plurality of estimated symbols. In an exemplary embodiment, UE 206 may further include a $u^{th}$ processor 214B. In an exemplary embodiment, the $u^{th}$ plurality of estimated symbols may be computed by utilizing processor 214B. In an exemplary embodiment, plurality of receive RF chains 208 may be coupled to processor 214B. In an exemplary embodiment, the $u^{th}$ plurality of estimated symbols may be computed by multiplying a receive vector by a digital combining matrix $W_{BB,u}$. In an exemplary embodiment, the receive vector may include the $u^{th}$ plurality of frequency-downconverted signals. In an exemplary embodiment, digital combining matrix $W_{BB,u}$ may be equal to $W_{BB,u}^{(1)} W_{BB,u}^{(2)}$. In an exemplary embodiment, digital combining matrix $W_{BB,u}$ may be implemented by a digital combiner. An exemplary digital combiner may be implemented by utilizing processor 214B.

Figure 3:
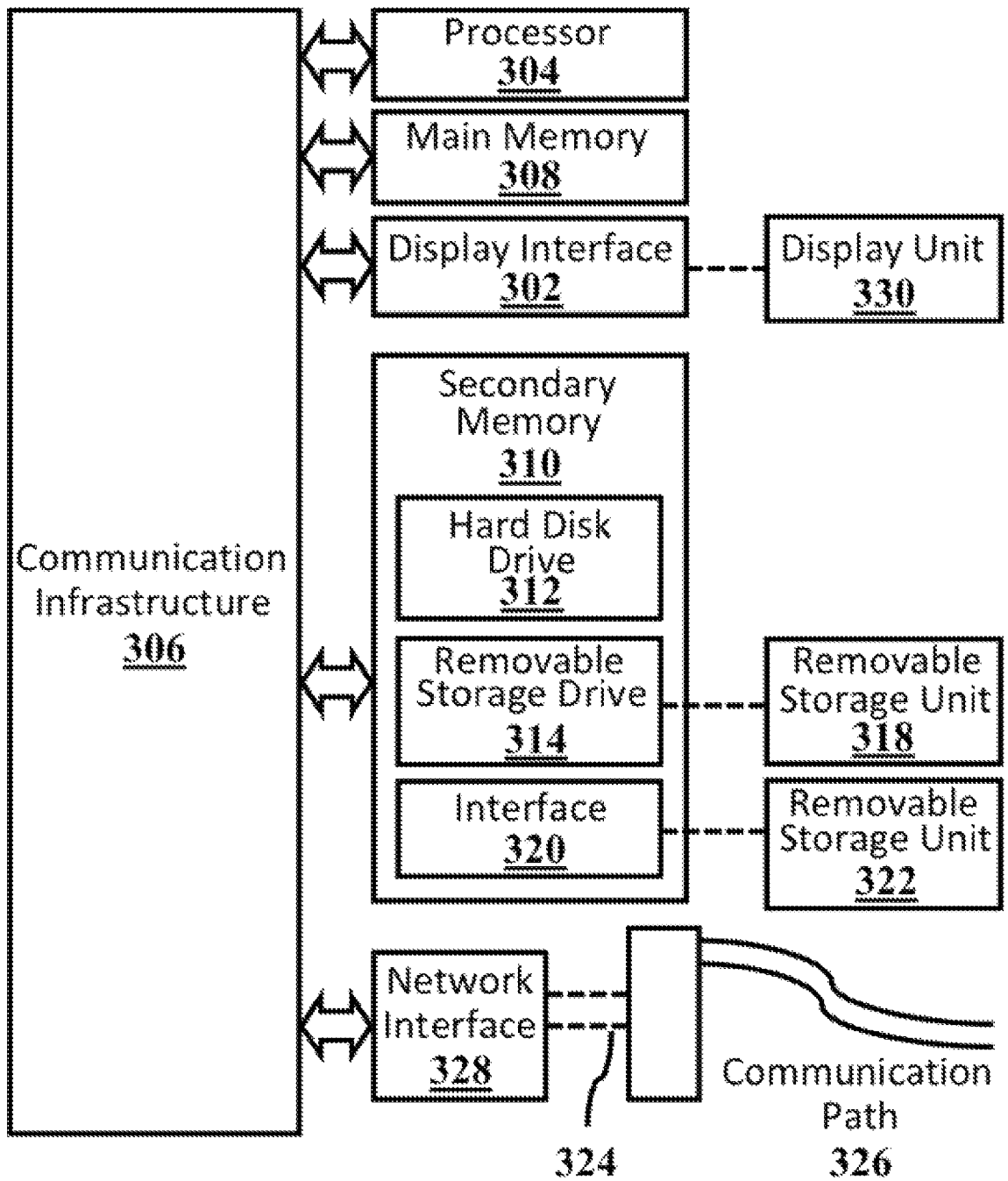
FIG. 3 shows a high-level functional block diagram of a computer system, consistent with one or more exemplary embodiments of the present disclosure.

FIG. 3 shows an example computer system 300 in which an embodiment of the present invention, or portions thereof, may be implemented as computer-readable code, consistent with exemplary embodiments of the present disclosure. For example, different steps of method 100 may be implemented in computer system 300 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2E.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 304 may be a special purpose (e.g., a graphical processing unit) or a general-purpose processor device. As will be appreciated by persons skilled in the relevant art, processor device 304 may also be a single processor in a multi-core/multiprocessor system, such system operating alone, or in a cluster of computing devices operating in a cluster or server farm. Processor device 304 may be connected to a communication infrastructure 306, for example, a bus, message queue, network, or multi-core message-passing scheme.

In an exemplary embodiment, computer system 300 may include a display interface 302, for example a video connector, to transfer data to a display unit 330, for example, a monitor. Computer system 300 may also include a main memory 308, for example, random access memory (RAM), and may also include a secondary memory 310. Secondary memory 310 may include, for example, a hard disk drive 312, and a removable storage drive 314. Removable storage drive 314 may include a floppy disk drive, a magnetic tape drive, an optical disk drive, a flash memory, or the like. Removable storage drive 314 may read from and/or write to a removable storage unit 318 in a well-known manner. Removable storage unit 318 may include a floppy disk, a magnetic tape, an optical disk, etc., which may be read by and written to by removable storage drive 314. As will be appreciated by persons skilled in the relevant art, removable storage unit 318 may include a computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from removable storage unit 322 to computer system 300.

Computer system 300 may also include a communications interface 324. Communications interface 324 allows software and data to be transferred between computer system 300 and external devices. Communications interface 324 may include a modem, a network interface 328 (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium may also refer to memories, such as main memory 308 and secondary memory 310, which may be memory semiconductors (e.g. DRAMs, etc.).

Computer programs (also called computer control logic) are stored in main memory 308 and/or secondary memory 310. Computer programs may also be received via communications interface 324. Such computer programs, when executed, enable computer system 300 to implement different embodiments of the present disclosure as discussed herein. In particular, the computer programs, when executed, enable processor device 304 to implement the processes of the present disclosure, such as the operations in method 100 illustrated by flowchart 100 of FIG. 1A discussed above. Accordingly, such computer programs represent controllers of computer system 300. Where an exemplary embodiment of method 100 is implemented using software, the software may be stored in a computer program product and loaded into computer system 300 using removable storage drive 314, interface 320, and hard disk drive 312, or communications interface 324.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

EXAMPLE

In this example, a performance of a method (similar to method 100) for hybrid digital-analog beamforming is demonstrated. Different steps of the method are implemented by utilizing a communication system (similar to communication system 200). The communication system includes a base station (similar to BS 202) equipped with a planar transmit antenna array including 144 transmit antennas (similar to plurality of transmit antennas 220). An inter-element spacing between adjacent transmit antennas is about half of an operating wavelength of the BS. A number of a plurality transmit symbols is equal to 12, that is, $N_s=12$. The communication system further includes 6 UEs (similar to set 204 of UEs), that is, U=6. Each UE in the set of UEs (similar to UE 206) includes a planar receive antenna array including 16 receive antennas (similar to plurality of receive antennas 210). A number of a $u^{th}$ plurality of estimated symbols is equal to 2, that is, $N_u=2$, $\forall u$. Each wireless channel in a set of wireless channels (similar to set 226 of wireless channels) includes a clustered channel with 5 clusters and 10 rays in each cluster. An angle spread of each cluster is about 10 degrees.

Figure 4:
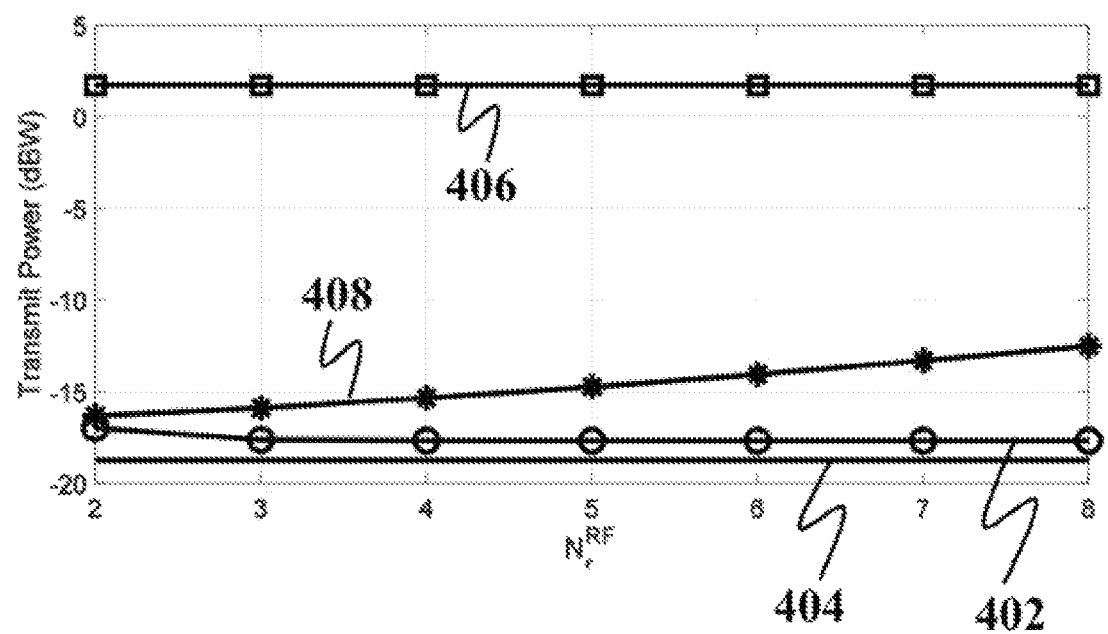
FIG. 4 shows a transmit power of a base station for different numbers of radio frequency chains, consistent with one or more exemplary embodiments of the present disclosure.

FIG. 4 shows a transmit power of a base station for different numbers of radio frequency chains, consistent with one or more exemplary embodiments of the present disclosure. A transmit power of different methods is shown for different values of $N_r^{RF}$, that is, different numbers of a plurality of receive RF chains (similar to plurality of receive RF chains 208). A number of a plurality of transmit RF chains (similar to plurality of transmit RF chains 216) is equal to $UN_r^{RF}$.

A first transmit power 402 is a transmit power of the BS. A second transmit power 404 is a transmit power for a lower bound on an optimal beamforming derived from non-interfering wireless channels in a set of wireless channels. A third transmit power 406 is a transmit power of fully digital beamforming with block diagonalization method. A fourth transmit power 408 is a transmit power of a BS with one-part baseband precoder and a set of UEs with one-part baseband combiners. Two-part baseband precoding and two-part combining results in about 1 dB optimality gap of first transmit power 402. In addition, first transmit power 402 is less than third of first transmit power 406 and fourth transmit power 408. In other words, two-part baseband precoding results in lower levels of transmit power in comparison with one-part baseband precoding and fully digital block diagonalization method.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A base station (BS) for hybrid digital-analog beamforming in communication systems, the BS comprising:
a memory having processor-readable instructions stored therein;
one or more processors configured to access the memory and execute the processor-readable instructions, which, when executed by the one or more processors configures the one or more processors to perform a method, the method comprising:
obtaining a hybrid precoding matrix $F_H$ by:
setting each entry of an RF precoding matrix $\overline{F}_{RF}^{(0)}$ to one of zero or a respective complex value with unit amplitude and a respective random phase; and
repeating an iterative process until a termination condition is satisfied, an $r^{th}$ iteration of the iterative process comprising:
computing a baseband precoding matrix $\overline{F}_{BB}^{(r)}$ according to an operation defined by $\overline{F}_{BB}^{(r)}=(\overline{F}_{RF}^{(r-1)H}\overline{F}_{RF}^{(r-1)})^{-1}\overline{F}_{RF}^{(r-1)H}V_W$ where $V_W$ comprises the plurality of dominant right eigenvectors of a first effective channel matrix $H_{mu}$ equal to $H_{mu}=[H_1^T \ldots H_U^T]^T$; and
computing an RF precoding matrix $\overline{F}_{RF}^{(r)}$ by one of:
setting a $(q, s)^{th}$ entry of $\overline{F}_{RF}^{(r)}$ to $e^{-j\angle\gamma_{q,s}^{(1)}}$ where:
$\gamma_{q,s}^{(1)}=\sum_{n=1}^{N_t^{RF}}\delta_{q,n}^*F_{s,n}$,
$\delta_{q,n}=V_{q,n}-\sum_{i\neq s}e^{j\theta_{q,i}}F_{i,n}$,
$V_{q,n}$ is a $(q,n)^{th}$ entry of $V_W$,
$F_{s,n}$ is an $(s, n)^{th}$ entry of $\overline{F}_{BB}^{(r)}$, and
$e^{j\theta_{q,i}}$ is a $(q, i)^{th}$ entry of $\overline{F}_{RF}^{(r-1)}$; or
setting the $(q, s)^{th}$ entry of $\overline{F}_{RF}^{(r)}$ to one of zero or $e^{-j\angle\gamma_{q,s}^{(2)}}$
where $\gamma_{q,s}^{(2)}=\sum_{n=1}^{N_t^{RF}}V_{q,n}*F_{s,n}$,
wherein:
the termination condition is defined according to $\|\overline{F}_{RF}^{(r-1)}\overline{F}_{BB}^{(r-1)}-V_W\|_F-\|\overline{F}_{RF}^{(r)}\overline{F}_{BB}^{(r)}-V_W\|_F\leq\epsilon_F$, $\epsilon_F$ is a threshold; and
$F_H=\overline{F}_{RF}^{(r_2)}\overline{F}_{BB}^{(r_2)}$, $F_{RF}=\overline{F}_{RF}^{(r_2)}$, $F_{BB}^{(1)}=\overline{F}_{BB}^{(r_2)}$ and $r_2$ is a total number of iterations of the iterative process when the termination condition is satisfied;
obtaining a digital precoding matrix $F_{BB}^{(2)}$ based on a second effective channel matrix associated with the hybrid precoding matrix $F_H$ and a set of channel matrices; and
generating the plurality of digitally precoded symbols by multiplying a transmit vector comprising a plurality of transmit symbols by a digital precoding matrix $F_{BB}$ equal to $F_{BB}^{(1)}F_{BB}^{(2)}$;
a plurality of transmit radio frequency (RF) chains configured to obtain a plurality of frequency-upconverted signals from the plurality of digitally precoded symbols, an amplitude and a phase of each of the plurality of frequency-upconverted signals associated with a respective digitally precoded symbol of the plurality of digitally precoded symbols, wherein $N_t^{RF}\geq N_s$ where $N_t^{RF}$ is a number of the plurality of transmit RF chains and $N_s$ is a number of the plurality of transmit symbols;
a plurality of transmit phase shifters configured to generate a plurality of transmit phase shifted signals by phase shifting the plurality of frequency-upconverted signals based on the analog precoding matrix $F_{RF}$; and
a plurality of transmit antennas configured to transmit a plurality of transmit signals associated with the plurality of transmit phase shifted signals to a wireless channels set associated with the channel matrices set, wherein $N_t^{RF}<N_t$ where $N_t$ is a number of the plurality of transmit antennas.

2. The BS of claim 1, wherein obtaining a digital precoding matrix $F_{BB}^{(2)}$ comprises:
obtaining a hybrid combining matrix $W_{H,u}$ based on a plurality of dominant left eigenvectors of a channel matrix $H_u$ in the set of channel matrices, wherein:
the hybrid combining matrix $W_{H,u}$ is associated with a $u^{th}$ UE and comprises a product of a digital combining matrix $W_{BB,u}^{(1)}$ and an analog combining matrix $W_{RF,u}$; and each entry of the analog combining matrix $W_{RF,u}$ comprises one of zero or a respective complex value with unit magnitude; and obtaining a precoding matrix $F_{BB,u}^{(2)}$ associated with the $u^{th}$ UE, comprising:

setting a unitary matrix $V_{1,u}$ to $N_u$ least dominant right eigenvectors of an interference channel $\overline{H}_u$, the interference channel $\overline{H}_u$ equal to $[H_{eff,1}^T, \ldots, H_{eff,u-1}^T, H_{eff,u+1}^T, \ldots, H_{eff,U}^T]^T$ where $H_{eff,u} = W_{H,u}^H H_u F_H$ and $U > 1$;

setting a unitary matrix $V_{2,u}$ to a plurality of right eigenvectors of $$R_{\tilde{n},u}^{-\frac{1}{2}} H_{eff,u} V_{1,u}$$

where $R_{\tilde{n},u} = W_{H,u}^H R_{n,u} W_{H,u}$, and $R_{n,u}$ is a covariance matrix of a noise vector at the $u^{th}$ UE;

obtaining a transmit power allocation matrix $P_u$ by:
computing a $k^{th}$ diagonal entry $p_{u,k}$ of the transmit power allocation matrix $P_u$ according to one of:
a first operation defined by $p_{u,k} = 1/\lambda_{u,k}^{-1}(\rho_{u,k}^{-1} - 1)$ where:
$\lambda_{u,k}$ is a $k^{th}$ dominant eigenvalue of $$R_{\tilde{n},u}^{-\frac{1}{2}} H_{eff,u} V_{1,u},$$

and
$\rho_{u,k}$ is a $k^{th}$ maximum acceptable mean-squared-error of the $u^{th}$ UE; or
a second operation defined by $$p_{u,k} = \max\left(\mu \lambda_{u,k}^{-\frac{1}{2}} - \lambda_{u,k}^{-1}, 0\right)$$

where:
$\mu$ satisfies a condition according to $$\sum_{u=1}^{U} \sum_{k=1}^{N_s} \max\left(\mu \lambda_{u,k}^{-\frac{1}{2}} - \lambda_{u,k}^{-1}, 0\right) = P_{max},$$

and
$P_{max}$ is a power budget of the BS; and
setting off-diagonal entries of the transmit power allocation matrix $P_u$ to zero; and
computing the precoding matrix $F_{BB,u}^{(2)}$ according to an operation defined by $$F_{BB,u}^{(2)} = V_{1,u} V_{2,u} P_u^{\frac{1}{2}},$$

wherein the digital precoding matrix $F_{BB}^{(2)}$ is equal to $[F_{BB,1}^{(2)}, \ldots, F_{BB,U}^{(2)}]$.

3. A method for hybrid digital-analog beamforming in communication systems, the method comprising:
obtaining a plurality of transmit phase shifted signals by:
obtaining, by utilizing one or more processors, a hybrid precoding matrix $F_H$ based on a plurality of dominant right eigenvectors of a first effective channel matrix associated with a set of channel matrices, wherein:
the hybrid precoding matrix $F_H$ comprises a product of a digital precoding matrix $F_{BB}^{(1)}$ and an analog precoding matrix $F_{RF}$, each entry of the analog precoding matrix $F_{RF}$ comprising one of zero or a respective complex value with unit magnitude; and
each channel matrix in the set of channel matrices is associated with a base station (BS) and a respective user equipment (UE) in a set of UEs;
obtaining, by utilizing the one or more processors, a digital precoding matrix $F_{BB}^{(2)}$ based on a second effective channel matrix associated with the hybrid precoding matrix $F_H$ and the set of channel matrices;
obtaining, by utilizing the one or more processors, a plurality of digitally precoded symbols by multiplying a transmit vector comprising a plurality of transmit symbols by a digital precoding matrix $F_{BB}$ equal to $F_{BB}^{(1)} F_{BB}^{(2)}$;
obtaining, by utilizing a plurality of transmit radio frequency (RF) chains of the BS, a plurality of frequency-upconverted signals from the plurality of digitally precoded symbols, an amplitude and a phase of each of the plurality of frequency-upconverted signals associated with a respective digitally precoded symbol of the plurality of digitally precoded symbols, wherein $N_t^{RF} \geq N_s$ where $N_t^{RF}$ is a number of the plurality of transmit RF chains and $N_s$ is a number of the plurality of transmit symbols; and
generating, by utilizing a plurality of transmit phase shifters of the BS, the plurality of transmit phase shifted signals by phase shifting the plurality of frequency-upconverted signals based on the analog precoding matrix $F_{RF}$;

obtaining a plurality of transmit signals from the plurality of transmit phase shifted signals; and
transmitting, by utilizing a plurality of transmit antennas of the BS, the plurality of transmit signals to a set of wireless channels associated with the set of channel matrices, wherein $N_t^{RF} < N_t$ where $N_t$ is a number of the plurality of transmit antennas.

4. The method of claim 3, wherein obtaining the hybrid precoding matrix $F_H$ comprises:
obtaining, by utilizing the one or more processors, a hybrid combining matrix $W_{H,u}$ of a set of hybrid combining matrices based on a plurality of dominant left eigenvectors of a channel matrix $H_u$ in the set of channel matrices, wherein:
the hybrid combining matrix $W_{H,u}$ is associated with a $u^{th}$ UE in the set of UEs where $1 \leq u \leq U$ and $U$ is a size of the set of UEs;
the hybrid combining matrix $W_{H,u}$ comprises a product of a digital combining matrix $W_{BB,u}^{(1)}$ and an analog combining matrix $W_{RF,u}$; and
each entry of the analog combining matrix $W_{RF,u}$ comprises one of zero or a respective complex value with unit magnitude; and
generating the hybrid precoding matrix $F_H$ based on the hybrid combining matrix $W_{H,u}$.

5. The method of claim 4, wherein obtaining the hybrid combining matrix $W_{H,u}$ comprises:
setting each entry of an RF combining matrix $\overline{W}_{RF}^{(0)}$ to one of zero or a respective complex value with unit amplitude and a respective random phase; and repeating a first iterative process until a first termination condition is satisfied, an $r^{th}$ iteration of the first iterative process comprising:
  computing a baseband combining matrix $\overline{W}_{BB}^{(r)}$ according to an operation defined by $\overline{W}_{BB}^{(r)} = (\overline{W}_{RF}^{(r-1)H} \overline{W}_{RF}^{(r-1)})^{-1} \overline{W}_{RF}^{(r-1)H} V_F$ where r≥1 is an integer and $V_F$ comprises the plurality of dominant left eigenvectors; and
  computing an RF combining matrix $\overline{W}_{RF}^{(r)}$ by one of:
    setting a $(k, l)^{th}$ entry of $\overline{W}_{RF}^{(r)}$ to $e^{-j\angle \beta_{k,l}(1)}$ where:

$\beta_{k,l}^{(1)} = \sum_{n=1}^{N_{r,u}^{RF}} \xi_{k,n}^* W_{l,n}$, $\xi_{k,n} = V_{k,n} - \sum_{i \neq l} e^{j\varphi_{k,i}} W_{i,n}$, $V_{k,n}$ is a $(k,n)^{th}$ entry of $V_F$,
  $W_{l,n}$ is an $(l, n)^{th}$ entry of $\overline{W}_{BB}^{(r)}$,
  $N_{r,u}^{RF}$ is a number of a $u^{th}$ plurality of receive RF chains of the $u^{th}$ and
  $e^{j\varphi_{k,i}}$ is a $(k, i)^{th}$ entry of $\overline{W}_{RF}^{(r-1)}$; or
  setting the $(k, l)^{th}$ entry of $\overline{W}_{RF}^{(r)}$ to one of zero or $e^{-j\angle \beta_{k,l}(2)}$ where $\beta_{k,l}^{(2)} = \sum_{n=1}^{N_{r,u}^{RF}} V_{k,n}^* W_{l,n}$, wherein:
  the first termination condition is defined according to $\|\overline{W}_{RF}^{(r-1)} \overline{W}_{BB}^{(r-1)} - V_F\|_F - \|\overline{W}_{RF}^{(r)} \overline{W}_{BB}^{(r)} - V_F\|_F \leq \in_W$, $\in_W$ is a first threshold, and $\|.\|_F$ is a Frobenius norm; and
  $W_{H,u} = \overline{W}_{RF}^{(r1)} \overline{W}_{BB}^{(r1)}$, $W_{RF,u} = \overline{W}_{RF}^{(r1)}$, $W_{BB,u}^{(1)} = \overline{W}_{BB}^{(r1)}$, and $r_1$ is a total number of iterations of the first iterative process when the first termination condition is satisfied.

6. The method of claim 4, wherein generating the hybrid precoding matrix $F_H$ comprises:
  setting each entry of an RF precoding matrix $\overline{F}_{RF}^{(0)}$ to one of zero or a respective complex value with unit amplitude and a respective random phase; and
  repeating a second iterative process until a second termination condition is satisfied, an $r^{th}$ iteration of the second iterative process comprising:
    computing a baseband precoding matrix $\overline{F}_{BB}^{(r)}$ according to an operation defined by $\overline{F}_{BB}^{(r)} = (\overline{F}_{RF}^{(r-1)H} \overline{F}_{RF}^{(r-1)})^{-1} \overline{F}_{RF}^{(r-1)H} V_W$ where $V_W$ comprises the plurality of dominant right eigenvectors of the first effective channel matrix equal to $W_{mu} H_{mu}$ where $H_{mu} = [H_1^T \ldots H_U^T]^T$ and $W_{mu}$ is a block diagonal matrix, each diagonal block of $W_{mu}$ comprising a respective hybrid combining matrix in the set of hybrid combining matrices; and
    computing an RF precoding matrix $\overline{F}_{RF}^{(r)}$ by one of:
      setting a $(q, s)^{th}$ entry of $\overline{F}_{RF}^{(r)}$ to $e^{-j\angle \gamma_{q,s}^{(1)}}$ where:

$\gamma_{q,s}^{(1)} = \sum_{n=1}^{N_t^{RF}} \delta_{q,n}^* F_{s,n}$, $\delta_{q,n} = V_{q,n} - \sum_{i \neq s} e^{j\varphi_{q,i}} F_{i,n}$, $V_{q,n}$ is a $(q, n)^{th}$ entry of $V_W$,
      $F_{s,n}$ is an $(s, n)^{th}$ entry of $\overline{F}_{BB}^{(r)}$, and
      $e^{j\theta_{q,i}}$ is a $(q, i)^{th}$ entry of $\overline{F}_{RF}^{(r-1)}$; or
      setting the $(q, s)^{th}$ entry of $\overline{F}_{RF}^{(r)}$ to one of zero or $e^{-j\angle \gamma_{q,s}^{(2)}}$ where $\gamma_{q,s}^{(2)} = \sum_{n=1}^{N_t^{RF}} V_{q,n}^* F_{s,n}$,
wherein:
  the second termination condition is defined according to $\|\overline{F}_{RF}^{(r-1)} \overline{F}_{BB}^{(r-1)} - V_W\|_F - \|\overline{F}_{RF}^{(r)} \overline{F}_{BB}^{(r)} - V_W\|_F \leq \in_F$, $\in_F$ is a second threshold; and
  $F_H = \overline{F}_{RF}^{(r2)} \overline{F}_{BB}^{(r2)}$, $F_{RF} = \overline{F}_{RF}^{(r2)}$, $F_{BB}^{(1)} = \overline{F}_{BB}^{(r2)}$ and $r_2$ is a total number of iterations of the second iterative process when the second termination condition is satisfied.

7. The method of claim 4, further comprising obtaining a $u^{th}$ plurality of estimated symbols by:
  computing a digital combining matrix $W_{BB,u}^{(2)}$ according to an operation defined by $W_{BB,u}^{(2)} = (H_{eff,u} F_{BB,u}^{(2)} F_{BB,u}^{(2)H} H_{eff,u}^H + R_{\tilde{n},u})^{-1} H_{eff,u} F_{BB,u}^{(2)}$, where:
  $H_{eff,u} = W_{H,u}^H H_u F_H$,
  $R_{\tilde{n},u} = W_{H,u}^H R_{n,u} W_{H,u}$, and
  $R_{n,u}$ is a covariance matrix of a noise vector at the $u^{th}$ UE;
  transmitting a $u^{th}$ combiner set comprising the digital combining matrix $W_{BB,u}^{(1)}$, the digital combining matrix $W_{BB,u}^{(2)}$, and the analog combining matrix $W_{RF,u}$ to the $u^{th}$ UE by the BS; and
  generating the $u^{th}$ the plurality of estimated symbols by the $u^{th}$ UE based on the $u^{th}$ combiner set.

8. The method of claim 7, wherein generating the $u^{th}$ the plurality of estimated symbols comprises:
  receiving the $u^{th}$ combiner set by the $u^{th}$ UE;
  receiving, by utilizing a $u^{th}$ plurality of receive antennas of the $u^{th}$ UE, a $u^{th}$ plurality of receive signals associated with the plurality of transmit signals;
  obtaining, by utilizing a $u^{th}$ plurality of receive phase shifters of the $u^{th}$ UE, a $u^{th}$ plurality of receive phase shifted signals by phase shifting the $u^{th}$ plurality of receive signals based on the analog combining matrix $W_{RF,u}$;
  obtaining, by utilizing a $u^{th}$ plurality of receive RF chains of the $u^{th}$ UE, a $u^{th}$ plurality of frequency-downconverted signals from the $u^{th}$ plurality of receive phase shifted signals, an amplitude and a phase of each of the $u^{th}$ plurality of frequency-downconverted signals associated with a respective receive phase shifted signal of the $u^{th}$ plurality of receive phase shifted signals, wherein:
    $N_{r,u}^{RF} \geq N_u$ where $N_{r,u}^{RF}$ is a number of the $u^{th}$ plurality of receive RF chains and $N_u$ is a number of the $u^{th}$ plurality of estimated symbols; and
    $N_{r,u}^{RF} < N_{r,u}$ where $N_{r,u}$ is a number of the $u^{th}$ plurality of receive antennas; and
  computing, by utilizing the one or more processors, the $u^{th}$ plurality of estimated symbols by multiplying a receive vector comprising the $u^{th}$ plurality of frequency-downconverted signals by a digital combining matrix $W_{BB,u}$ equal to $W_{BB,u}^{(1)} W_{BB,u}^{(2)}$.

9. The method of claim 7, wherein obtaining the digital precoding matrix $F_{BB}^{(2)}$ comprises obtaining a precoding matrix $F_{BB,u}^{(2)}$ associated with the $u^{th}$ UE, obtaining the precoding matrix $F_{BB,u}^{(2)}$ comprising:
  setting a unitary matrix $V_{1,u}$ to $N_u$ least dominant right eigenvectors of an interference channel $\overline{H}_u$, the interference channel $\overline{H}_u$ equal to $[H_{eff,1}^T, \ldots H_{eff,u-1}^T, H_{eff,u+1}^T, \ldots, H_{eff,U}^T]^T$ where $U > 1$;
  setting a unitary matrix $V_{2,u}$ to a plurality of right eigenvectors of $R_{\tilde{n},u}^{-\frac{1}{2}} H_{eff,u} V_{1,u}$;

obtaining a transmit power allocation matrix $P_u$ based on the set of channel matrices, the hybrid precoding matrix $F_H$, and the set of hybrid combining matrices, the transmit power allocation matrix $P_u$ comprising a diagonal matrix, each diagonal entry of the transmit power allocation matrix $P_u$ comprising a respective non-negative value; and computing the precoding matrix $F_{BB,u}^{(2)}$ according to an operation defined by $$F_{BB,u}^{(2)} = V_{1,u} V_{2,u} P_u^{\frac{1}{2}},$$

wherein the digital precoding matrix $F_{BB}^{(2)}$ is equal to $[F_{BB,1}^{(2)}, \ldots, F_{BB,U}^{(2)}]$.

10. The method of claim 9, wherein obtaining the transmit power allocation matrix $P_u$ comprises computing a $k^{th}$ diagonal entry $p_{u,k}$ of the transmit power allocation matrix $P_u$ according to one of:
   a first operation defined by $p_{u,k}=1/\lambda_{u,k}^{-1}(\rho_{u,k}^{-1}-1)$ where: $\lambda_{u,k}$ is a $k^{th}$ dominant eigenvalue of $R_{\tilde{n},u}^{1/2} H_{eff,u} V_{1,u}$, and
   $\rho_{u,k}$ is a $k^{th}$ maximum acceptable mean-squared-error of the $u^{th}$ UE; or
   a second operation defined by $$p_{u,k} = \max\left(\mu \lambda_{u,k}^{-\frac{1}{2}} - \lambda_{u,k}^{-1}, 0\right)$$

where:
$\mu$ satisfies a condition according to $$\Sigma_{u=1}^{U} \Sigma_{k=1}^{N_s} \max\left(\mu \lambda_{u,k}^{-\frac{1}{2}} - \lambda_{u,k}^{-1}, 0\right) = P_{max},$$

and
$P_{max}$ is a power budget of the BS.

11. The method of claim 7, wherein obtaining the digital precoding matrix $F_{BB}^{(2)}$ comprises obtaining a precoding matrix $F_{BB,1}^{(2)}$ associated with a first ($1^{st}$) UE in the set of UEs by:
   setting a unitary matrix $V_3$ to a plurality of right eigenvectors of $$R_{\tilde{n},1}^{-\frac{1}{2}} H_{eff,1};$$

obtaining a transmit power allocation matrix $P_1$ based on the set of channel matrices, the hybrid precoding matrix $F_H$, and the set of hybrid combining matrices, the transmit power allocation matrix $P_1$ comprising a diagonal matrix, each diagonal entry of the transmit power allocation matrix $P_1$ comprising a respective non-negative value; and
   computing the precoding matrix $F_{BB,1}^{(2)}$ according to an operation defined by $$F_{BB,1}^{(2)} = V_3 P_1^{\frac{1}{2}}$$

wherein the digital precoding matrix $F_{BB}^{(2)}$ is equal to $F_{BB,1}^{(2)}$.

12. The method of claim 11, wherein obtaining the transmit power allocation matrix $P_1$ comprises computing a $k^{th}$ diagonal entry $p_{1,k}$ of the transmit power allocation matrix $P_1$ according to one of:

a third operation defined by $p_{1,k}=1/\lambda_{1,k}^{-1}(\rho_{1,k}^{-1}-1)$ where:
$\lambda_{1,k}$ is a $k^{th}$ dominant eigenvalue of $$R_{\tilde{n},1}^{-\frac{1}{2}} H_{eff,1},$$

and
$\rho_{1,k}$ is a $k^{th}$ maximum acceptable mean-squared-error of the first ($1^{st}$) UE; or
a fourth operation defined by $$p_{1,k} = \max\left(\mu \lambda_{1,k}^{-\frac{1}{2}} - \lambda_{1,k}^{-1}, 0\right)$$

where:
$\mu$ satisfies a condition according to $$\sum_{k=1}^{N_s} \max\left(\mu \lambda_{1,k}^{-\frac{1}{2}} - \lambda_{1,k}^{-1}, 0\right) = P_{max},$$

and
$P_{max}$ is a power budget of the BS.

13. A communication system for hybrid digital-analog beamforming, comprising:
   a base station (BS) comprising:
      a plurality of transmit radio frequency (RF) chains;
      a plurality of transmit phase shifters coupled to the plurality of RF chains; and
      a plurality of transmit antennas coupled to the plurality of transmit phase shifters;
   a memory having processor-readable instructions stored therein; and
   one or more processors configured to access the memory and execute the processor-readable instructions, which, when executed by the one or more processors configures the one or more processors to perform a method, the method comprising:
      obtaining a plurality of transmit phase shifted signals by:
         obtaining a hybrid precoding matrix $F_H$ based on a plurality of dominant right eigenvectors of a first effective channel matrix associated with a set of channel matrices, wherein:
            the hybrid precoding matrix $F_H$ comprises a product of a digital precoding matrix $F_{BB}^{(1)}$ and an analog precoding matrix $F_{RF}$, each entry of the analog precoding matrix $F_{RF}$ comprising one of zero or a respective complex value with unit magnitude; and
            each channel matrix in the set of channel matrices is associated with the BS and a respective user equipment (UE) in a set of UE;
         obtaining a digital precoding matrix $F_{BB}^{(2)}$ based on a second effective channel matrix associated with the hybrid precoding matrix $F_H$ and the set of channel matrices;
         obtaining a plurality of digitally precoded symbols by multiplying a transmit vector comprising a plurality of transmit symbols by a digital precoding matrix $F_{BB}$ equal to $F_{BB}^{(1)} F_{BB}^{(2)}$;

obtaining, by utilizing the plurality of transmit RF chains, a plurality of frequency-upconverted signals from the plurality of digitally precoded symbols, an amplitude and a phase of each of the plurality of frequency-upconverted signals associated with a respective digitally precoded symbol of the plurality of digitally precoded symbols, wherein $N_t^{RF} \geq N_s$ where $N_t^{RF}$ is a number of the plurality of transmit RF chains and $N_s$ is a number of the plurality of transmit symbols; and generating, by utilizing the plurality of transmit phase shifters, the plurality of transmit phase shifted signals by phase shifting the plurality of frequency-upconverted signals based on the analog precoding matrix $F_{RF}$;

obtaining a plurality of transmit signals from the plurality of transmit phase shifted signals; and transmitting, by utilizing the plurality of transmit antennas, the plurality of transmit signals to a set of wireless channels associated with the set of channel matrices, wherein $N_t^{RF} < N_t$ where $N_t$ is a number of the plurality of transmit antennas.

14. The system of claim 13, wherein obtaining the hybrid precoding matrix $F_H$ comprises:

obtaining, by utilizing the one or more processors, a hybrid combining matrix $W_{H,u}$ of a set of hybrid combining matrices based on a plurality of dominant left eigenvectors of a channel matrix $H_u$ in the set of channel matrices, wherein:

the hybrid combining matrix $W_{H,u}$ is associated with a $u^{th}$ UE in the set of UEs where $1 \leq u \leq U$ and U is a size of the set of UEs;

the hybrid combining matrix $W_{H,u}$ comprises a product of a digital combining matrix $W_{BB,u}^{(1)}$ and an analog combining matrix $W_{RF,u}$; and each entry of the analog combining matrix $W_{RF,u}$ comprises one of zero or a respective complex value with unit magnitude; and generating the hybrid precoding matrix $F_H$ based on the hybrid combining matrix $W_{H,u}$.

15. The system of claim 14, wherein obtaining the hybrid combining matrix $W_{H,u}$ comprises:

setting each entry of an RF combining matrix $\overline{W}_{RF}^{(0)}$ to one of zero or a respective complex value with unit amplitude and a respective random phase; and repeating a first iterative process until a first termination condition is satisfied, an $r^{th}$ iteration of the first iterative process comprising:

computing a baseband combining matrix $\overline{W}_{BB}^{(r)}$ according to an operation) defined by $\overline{W}_{BB}^{(r)} = (\overline{W}_{RF}^{(r-1)H} \overline{W}_{RF}^{(r-1)})^{-1} \overline{W}_{RF}^{(r-1)H} V_F$ where $r \geq 1$ is an integer and $V_F$ comprises the plurality of dominant left eigenvectors; and computing an RF combining matrix $\overline{W}_{RF}^{(r)}$ by one of:
setting a $(k, l)^{th}$ entry of $\overline{W}_{RF}^{(r)}$ to $e^{-j \angle \beta_{k,l}(1)}$ where:

$\beta_{k,l}^{(1)} = \sum_{n=1}^{N_{r,u}^{RF}} \xi_{k,n}^* W_{l,n}$, $\xi_{k,n} = V_{k,n} - \sum_{i \neq l} e^{j\varphi_{k,i}} W_{i,n}$, $V_{k,n}$ is a $(k, n)^{th}$ entry of $V_F$,
$W_{l,n}$ is an $(l, n)^{th}$ entry of $\overline{W}_{BB}^{(r)}$,
$N_{r,u}^{RF}$ is a number of a $u^{th}$ plurality of receive RF chains of the $u^{th}$ UE, and
$e^{j\varphi_{k,l}}$ is a $(k, i)^{th}$ entry of $\overline{W}_{RF}^{(r-1)}$; or
setting the $(k, l)^{th}$ entry of $\overline{W}_{RF}^{(r)}$ to one of zero or $e^{-j\angle \beta_{k,l}(2)}$ where $\beta_{k,l}^{(2)} = \sum_{n=1}^{N_{r,u}^{RF}} V_{k,n}^* W_{l,n}$, wherein:
the first termination condition is defined according to $\|\overline{W}_{RF}^{(r-1)} \overline{W}_{BB}^{(r-1)} - V_F\|_F - \|\overline{W}_{RF}^{(r)} \overline{W}_{BB}^{(r)} - V_F\|_F \leq \epsilon_W$, $\epsilon_W$ is a first threshold, and $\|.\|_F$ is a Frobenius norm; and $W_{H,u} = \overline{W}_{RF}^{(r_1)} \overline{W}_{BB}^{(r_1)}$, $W_{RF,u} = \overline{W}_{RF}^{(r_1)}$, $W_{BB,u}^{(1)} = \overline{W}_{BB}^{(r_1)}$, and $r_1$ is a total number of iterations of the first iterative process when the first termination condition is satisfied.

16. The system of claim 14, wherein obtaining the hybrid precoding matrix $F_H$ comprises:

setting each entry of an RF precoding matrix $\overline{F}_{RF}^{(0)}$ to one of zero or a respective complex value with unit amplitude and a respective random phase; and repeating a second iterative process until a second termination condition is satisfied, an $r^{th}$ iteration of the second iterative process comprising:

computing a baseband precoding matrix $\overline{F}_{BB}^{(r)}$ according to an operation defined by $\overline{F}_{BB}^{(r)} = (\overline{F}_{RF}^{(r-1)H} \overline{F}_{RF}^{(r-1)})^{-1} \overline{F}_{RF}^{(r-1)H} V_W$ where $V_W$ comprises the plurality of dominant right eigenvectors of the first effective channel matrix equal to $W_{mu} H_{mu}$ where $H_{mu} = [H_1^T \ldots H_U^T]^T$ and $W_{mu}$ is a block diagonal matrix, each diagonal block of $W_{mu}$ comprising a respective hybrid combining matrix in the set of hybrid combining matrices; and computing an RF precoding matrix $\overline{F}_{RF}^{(r)}$ by one of:
setting a $(q, s)^{th}$ entry of $\overline{F}_{RF}^{(r)}$ to $e^{-j \angle \gamma_{q,s}(1)}$ where:

$\gamma_{q,s}^{(1)} = \sum_{n=1}^{N_t^{RF}} \xi_{q,n}^* F_{s,n}$, $\delta_{q,n} = V_{q,n} - \sum_{i \neq s} e^{j\varphi_{q,i}} F_{i,n}$, $V_{q,n}$ is a $(q, n)^{th}$ entry of $V_W$,
$F_{s,n}$ is an $(s, n)^{th}$ entry of $\overline{F}_{BB}^{(r)}$, and
$e^{j\theta_{q,i}}$ is a $(q, i)^{th}$ entry of $\overline{F}_{RF}^{(r-1)}$; or
setting the $(q, s)^{th}$ entry of $\overline{F}_{RF}^{(r)}$ to one of zero or $e^{-j \angle \gamma_{q,s}(2)}$ where $\gamma_{q,s}^{(2)} = \sum_{n=1}^{N_t^{RF}} V_{q,n}^* F_{s,n}$, wherein:
the second termination condition is defined according to $\|\overline{F}_{RF}^{(r-1)} \overline{F}_{BB}^{(r-1)} - V_W\|_F - \|\overline{F}_{RF}^{(r)} \overline{F}_{BB}^{(r)} - V_W\|_F \leq \epsilon_F$, $\epsilon_F$ is a second threshold; and $F_H = \overline{F}^{(r_2)} \overline{F}_{BB}^{(r_2)}$, $F_{RF} = \overline{F}_{RF}^{(r_2)}$, $F_{BB}^{(1)} = \overline{F}_{BB}^{(r_2)}$ and $r_2$ is a total number of iterations of the second iterative process when the second termination condition is satisfied.

17. The system of claim 14, wherein the method further comprises obtaining a $u^{th}$ plurality of estimated symbols by:

computing a digital combining matrix $W_{BB,u}^{(2)}$ according to an operation defined by $W_{BB,u}^{(2)} = (H_{eff,u} F_{BB,u}^{(2)} F_{BB,u}^{(2)H} H_{eff,u}^H + R_{\tilde{n},u})^{-1} H_{eff,u} F_{BB,u}^{(2)}$, where:

$H_{eff,u} = W_{H,u}^H H_u F_H$,
$R_{\tilde{n},u} = W_{H,u}^H R_{n,u} W_{H,u}$, and
$R_{n,u}$ is a covariance matrix of a noise vector at the $u^{th}$ UE;

transmitting a $u^{th}$ combiner set comprising the digital combining matrix $W_{BB,u}^{(1)}$, the digital combining matrix $W_{BB,u}^{(2)}$, and the analog combining matrix $W_{RF,u}$ to the $u^{th}$ UE by the BS; and generating the $u^{th}$ the plurality of estimated symbols by the $u^{th}$ UE based on the $u^{th}$ combiner set.

18. The system of claim 17, wherein generating the $u^{th}$ the plurality of estimated symbols comprises:

receiving the $u^{th}$ combiner set by the $u^{th}$ UE;

receiving, by utilizing a $u^{th}$ plurality of receive antennas of the $u^{th}$ UE, a $u^{th}$ plurality of receive signals associated with the plurality of transmit signals;

obtaining, by utilizing a $u^{th}$ plurality of receive phase shifters of the $u^{th}$ UE, a $u^{th}$ plurality of receive phase shifted signals by phase shifting the $u^{th}$ plurality of receive signals based on the analog combining matrix $W_{RF,u}$;

obtaining, by utilizing a $u^{th}$ plurality of receive RF chains of the $u^{th}$ UE, a $u^{th}$ plurality of frequency-downconverted signals from the $u^{th}$ plurality of receive phase shifted signals, an amplitude and a phase of each of the $u^{th}$ plurality of frequency-downconverted signals associated with a respective receive phase shifted signal of the $u^{th}$ plurality of receive phase shifted signals, wherein:

$N_{r,u}^{RF} \geq N_u$ where $N_{r,u}^{RF}$ is a number of the $u^{th}$ plurality of receive RF chains and $N_u$ is a number of the $u^{th}$ plurality of estimated symbols; and $N_{r,u}^{RF} < N_{r,u}$ where $N_{r,u}$ is a number of the $u^{th}$ plurality of receive antennas; and computing the $u^{th}$ plurality of estimated symbols by multiplying a receive vector comprising the $u^{th}$ plurality of frequency-downconverted signals by a digital combining matrix $W_{BB,u}$ equal to $W_{BB,u}^{(1)} W_{BB,u}^{(2)}$.

19. The system of claim 17, wherein obtaining the digital precoding matrix $F_{BB}^{(2)}$ comprises obtaining a precoding matrix $F_{BB,u}^{(2)}$ associated with the $u^{th}$ UE, obtaining the precoding matrix $F_{BB}^{(2)}$ comprising:

setting a unitary matrix $V_{1,u}$ to $N_u$ least dominant right eigenvectors of an interference channel $\overline{H}_u$, the interference channel $\overline{H}_u$ equal to $[H_{eff,1}, \ldots, H_{eff,u-1}^T, H_{eff,u+1}^T, \ldots, H_{eff,U}^T]^T$ where $U>1$;

setting a unitary matrix $V_{2,u}$ to a plurality of right eigenvectors of $$R_{\tilde{n},u}^{-\frac{1}{2}} H_{eff,u} V_{1,u};$$

obtaining a transmit power allocation matrix $P_u$ by computing a $k^{th}$ diagonal entry $p_{u,k}$ of the transmit power allocation matrix $P_u$ according to one of a first operation defined by $p_{u,k} = 1/\lambda_{u,k}^{-1}(\rho_{u,k}^{-1} - 1)$ where:

$\lambda_{u,k}$ is a $k^{th}$ dominant eigenvalue of $$R_{\tilde{n},u}^{-\frac{1}{2}} H_{eff,u} V_{1,u},$$

and $\rho_{u,k}$ is a $k^{th}$ maximum acceptable mean-squared-error of the $u^{th}$ UE; or a second operation defined by $$p_{u,k} = \max\left(\mu \lambda_{u,k}^{-\frac{1}{2}} - \lambda_{u,k}^{-1}, 0\right)$$

where:

$\mu$ satisfies a condition according to $$\sum_{u=1}^{U} \sum_{k=1}^{N_s} \max\left(\mu \lambda_{u,k}^{-\frac{1}{2}} - \lambda_{u,k}^{-1}, 0\right) = P_{max},$$

and $P_{max}$ is a power budget of the BS; and setting off-diagonal entries of the transmit power allocation matrix $P_u$ to zero; and computing the precoding matrix $F_{BB}^{(2)}$ according to an operation defined by $$F_{BB,u}^{(2)} = V_{1,u} V_{2,u} P_u^{\frac{1}{2}},$$

wherein the digital precoding matrix $F_{BB}^{(2)}$ is equal to $[F_{BB,1}^{(2)}, \ldots, F_{BB,U}^{(2)}]$.

20. The system of claim 17, wherein obtaining the digital precoding matrix $F_{BB}^{(2)}$ comprises obtaining a precoding matrix $F_{BB,1}^{(2)}$ associated with a first ($1^{st}$) UE in the set of UEs by:

setting a unitary matrix $V_3$ to a plurality of right eigenvectors of $$R_{\tilde{n},1}^{-\frac{1}{2}} H_{eff,1};$$

obtaining a transmit power allocation matrix $P_1$ by computing a $k^{th}$ diagonal entry $p_{1,k}$ of the transmit power allocation matrix $P_1$ according to one of:

a third operation defined by $p_{1,k} = 1/\lambda_{1,k}^{-1}(\rho_{1,k}^{-1} - 1)$ where:

$\lambda_{1,k}$ is a $k^{th}$ dominant eigenvalue of $$R_{\tilde{n},1}^{-\frac{1}{2}} H_{eff,1},$$

and $\rho_{1,k}$ is a $k^{th}$ maximum acceptable mean-squared-error of a first ($1^{st}$) UE in the set of UEs; or a fourth operation defined by $$p_{1,k} = \max\left(\mu \lambda_{1,k}^{-\frac{1}{2}} - \lambda_{1,k}^{-1}, 0\right)$$

where:

$\mu$ satisfies a condition according to $$\sum_{k=1}^{N_s} \max\left(\mu \lambda_{1,k}^{-\frac{1}{2}} - \lambda_{1,k}^{-1}, 0\right) = P_{max},$$

and $P_{max}$ is a power budget of the BS; and setting off-diagonal entries of the transmit power allocation matrix $P_1$ to zero; and computing the precoding matrix $F_{BB,1}^{(2)}$ according to an operation defined by $$F_{BB,1}^{(2)} = V_3 P_1^{\frac{1}{2}}$$

wherein the digital precoding matrix $F_{BB}^{(2)}$ is equal to $F_{BB,1}^{(2)}$.

* * * * *